(12) United States Patent
Wang et al.

(10) Patent No.: US 10,293,775 B2
(45) Date of Patent: May 21, 2019

(54) FRONTAL AIRBAG ASSEMBLIES FOR REDUCING ROTATIONAL VELOCITY OF A HEAD OF AN OCCUPANT

(71) Applicant: Autoliv ASP, Inc., Ogden, UT (US)

(72) Inventors: Xiaohong Wang, Roy, UT (US); Changsoo Choi, Rochester, NY (US); Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/331,257

(22) Filed: Oct. 21, 2016

(65) Prior Publication Data

US 2018/0111581 A1 Apr. 26, 2018

(51) Int. Cl.
| | |
|---|---|
| *B60R 21/231* | (2011.01) |
| *B60R 21/205* | (2011.01) |
| *B60R 21/2338* | (2011.01) |
| *B60R 21/233* | (2006.01) |
| *B60R 21/00* | (2006.01) |

(52) U.S. Cl.
CPC .......... *B60R 21/231* (2013.01); *B60R 21/205* (2013.01); *B60R 21/233* (2013.01); *B60R 21/2338* (2013.01); *B60R 2021/0048* (2013.01); *B60R 2021/23324* (2013.01); *B60R 2021/23332* (2013.01); *B60R 2021/23382* (2013.01)

(58) Field of Classification Search
CPC .......................... B60R 21/2338; B60R 21/205
See application file for complete search history.

(56) References Cited

U.S. PATENT DOCUMENTS

| 5,044,663 | A | * | 9/1991 | Seizert | B60R 21/233 264/515 |
|---|---|---|---|---|---|
| 5,205,584 | A | * | 4/1993 | Honda | B60R 21/217 280/743.2 |
| 5,253,892 | A | | 10/1993 | Satoh | |
| 5,362,101 | A | * | 11/1994 | Sugiura | B60R 21/233 280/728.2 |

(Continued)

FOREIGN PATENT DOCUMENTS

| DE | 102007032763 A1 * | 1/2008 | ........... B60R 21/233 |
|---|---|---|---|
| DE | 102012018450 A1 | 3/2014 | |

(Continued)

OTHER PUBLICATIONS

Final Office Action dated Dec. 19, 2017 in U.S. Appl. No. 15/177,227.

(Continued)

*Primary Examiner* — Nicole T Verley
(74) *Attorney, Agent, or Firm* — Stoel Rives LLP

(57) ABSTRACT

Airbag assemblies are disclosed that can reduce rotational velocity of an occupant's head during a collision event and thereby mitigate traumatic brain injury/head injury to an occupant. An airbag includes a pair of lobes or protrusions to deploy and extend from the rear face of the airbag on either side of the occupant's head to limit rotation of the head. A pair of vertical tethers within an interior of the airbag configure the lobes and contour the rear face to form one or more low fabric tension zones or bubbles. The lobes maintain high fabric tension, similar to a pressurization of a main inflatable chamber of the airbag.

21 Claims, 21 Drawing Sheets

(56) References Cited

U.S. PATENT DOCUMENTS

| | | | |
|---|---|---|---|
| 6,254,121 B1* | 7/2001 | Fowler | B60R 21/233 280/729 |
| 6,254,130 B1* | 7/2001 | Jayaraman | B60R 21/233 280/731 |
| 6,454,300 B1* | 9/2002 | Dunkle | B60R 21/231 280/742 |
| 6,857,659 B2 | 2/2005 | Webber | B60R 21/217 280/743.2 |
| 7,377,548 B2* | 5/2008 | Bauer | B60R 21/231 280/743.2 |
| 7,506,892 B2* | 3/2009 | Klinkenberger | B60R 21/233 280/743.2 |
| 7,552,942 B2* | 6/2009 | Fischer | B60R 21/2338 280/734 |
| 7,625,008 B2* | 12/2009 | Pang | B60R 21/231 280/743.1 |
| 7,631,895 B2* | 12/2009 | Kalliske | B60R 21/233 280/743.2 |
| 7,661,700 B2* | 2/2010 | Imamura | B60R 21/203 280/730.1 |
| 7,766,385 B2* | 8/2010 | Fukawatase | B60R 21/233 280/743.2 |
| 7,850,203 B2* | 12/2010 | Niwa | B60R 21/233 280/743.2 |
| 7,862,073 B2* | 1/2011 | Thomas | B60R 21/231 280/729 |
| 8,256,798 B2* | 9/2012 | Yamazaki | B60R 21/231 280/732 |
| 8,308,188 B2* | 11/2012 | Kumagai | B60R 21/2338 280/732 |
| 8,371,612 B2 | 2/2013 | Williams | |
| 8,419,054 B2 | 4/2013 | Abe | |
| 8,678,429 B2 | 3/2014 | Nagasawa et al. | |
| 8,864,170 B2 | 10/2014 | Yamada et al. | |
| 8,899,618 B2 | 12/2014 | Eckert et al. | |
| 9,150,189 B1 | 10/2015 | Nelson et al. | |
| 9,434,344 B2* | 9/2016 | Fukawatase | B60R 21/2338 |
| 9,499,118 B2* | 11/2016 | Jindal | B60R 21/231 |
| 9,522,648 B2* | 12/2016 | Fukawatase | B60R 21/233 |
| 9,623,831 B1* | 4/2017 | Deng | B60R 21/239 |
| 9,650,011 B1 | 5/2017 | Belwafa | |
| 9,676,355 B2* | 6/2017 | Kruse | B60R 21/0136 |
| 9,676,362 B1 | 6/2017 | Deng et al. | |
| 9,676,364 B2* | 6/2017 | Williams | B60R 21/239 |
| 9,738,243 B2* | 8/2017 | Fukawatase | B60R 21/233 |
| 9,758,123 B2* | 9/2017 | Yamada | B60R 21/235 |
| 9,771,047 B2* | 9/2017 | Kruse | B60R 21/2338 |
| 9,789,842 B2* | 10/2017 | Shin | B60R 21/233 |
| 9,840,223 B2* | 12/2017 | Choi | B60R 21/2338 |
| 9,845,067 B2* | 12/2017 | Morris | B60R 21/233 |
| 2004/0174003 A1 | 9/2004 | Dominissini | |
| 2004/0256848 A1 | 12/2004 | Miyata et al. | |
| 2005/0098994 A1 | 5/2005 | Matsumura | |
| 2005/0110249 A1 | 5/2005 | Hasebe | |
| 2005/0184489 A1* | 8/2005 | Kobayashi | B60R 21/231 280/729 |
| 2006/0186647 A1 | 8/2006 | Bosch | |
| 2006/0186656 A1* | 8/2006 | Kumagai | B60R 21/231 280/743.2 |
| 2006/0279072 A1 | 12/2006 | Hanawa et al. | |
| 2007/0108753 A1 | 5/2007 | Pang et al. | |
| 2008/0023943 A1* | 1/2008 | Kwon | B60R 21/233 280/728.2 |
| 2009/0194981 A1 | 8/2009 | Mendez | |
| 2009/0224522 A1 | 9/2009 | Fischer et al. | |
| 2009/0302587 A1 | 12/2009 | Thomas | |
| 2010/0032931 A1 | 2/2010 | Kumagai et al. | |
| 2012/0025505 A1 | 2/2012 | Abramoski et al. | |
| 2013/0001934 A1 | 1/2013 | Nagasawa et al. | |
| 2014/0327234 A1 | 11/2014 | Heurlin et al. | |
| 2016/0207490 A1 | 7/2016 | Yamada et al. | |
| 2016/0250993 A1 | 9/2016 | Nagatani et al. | |
| 2016/0280176 A1 | 9/2016 | Yamada | |
| 2016/0311392 A1 | 10/2016 | Jindal et al. | |
| 2017/0015266 A1 | 1/2017 | El-Jawahri et al. | |
| 2017/0088080 A1* | 3/2017 | Hotta | B60R 21/2338 |
| 2017/0088087 A1* | 3/2017 | Williams | B60R 21/2338 |
| 2017/0129444 A1 | 5/2017 | Fukawatase et al. | |
| 2017/0136981 A1* | 5/2017 | Fukawatase | B60R 21/233 |
| 2017/0166159 A1 | 6/2017 | Shin | |
| 2017/0253212 A1* | 9/2017 | Choi | B60R 21/233 |
| 2017/0355344 A1 | 12/2017 | Choi et al. | |

FOREIGN PATENT DOCUMENTS

| | | | | |
|---|---|---|---|---|
| DE | 102015004956 A1 | * | 10/2016 | B60R 21/233 |
| DE | 102015004956 A1 | | 10/2016 | |
| JP | H0332956 A | | 2/1991 | |
| JP | H1148906 A | | 2/1999 | |
| JP | 2006088856 A | | 4/2006 | |
| JP | 2008044594 A | * | 2/2008 | B60R 21/233 |
| JP | 2011225139 A | * | 11/2011 | |
| JP | 5408268 B2 | * | 2/2014 | B60R 21/205 |
| JP | 5483568 B2 | * | 5/2014 | |
| JP | 5491332 B2 | * | 5/2014 | |
| JP | 2014237382 A | * | 12/2014 | |
| WO | WO-2008063103 A1 | * | 5/2008 | B60R 21/205 |
| WO | WO-2016147732 A1 | * | 9/2016 | B60R 21/205 |

OTHER PUBLICATIONS

International Search Report and Written Opinion for PCT/US2017/028271, dated Jul. 3, 2017.
Non-Final Office Action dated Jul. 28, 2017 in U.S. Appl. No. 15/177,227.
International Search Report and Written Opinion for PCT/US2017/040048, dated Sep. 12, 2017.
Choi, et al., Office Action dated May 3, 2018 in U.S. Appl. No. 15/177,227.
Choi, et al., Office Action dated Dec. 10, 2018 in U.S. Appl. No. 15/177,227.

* cited by examiner

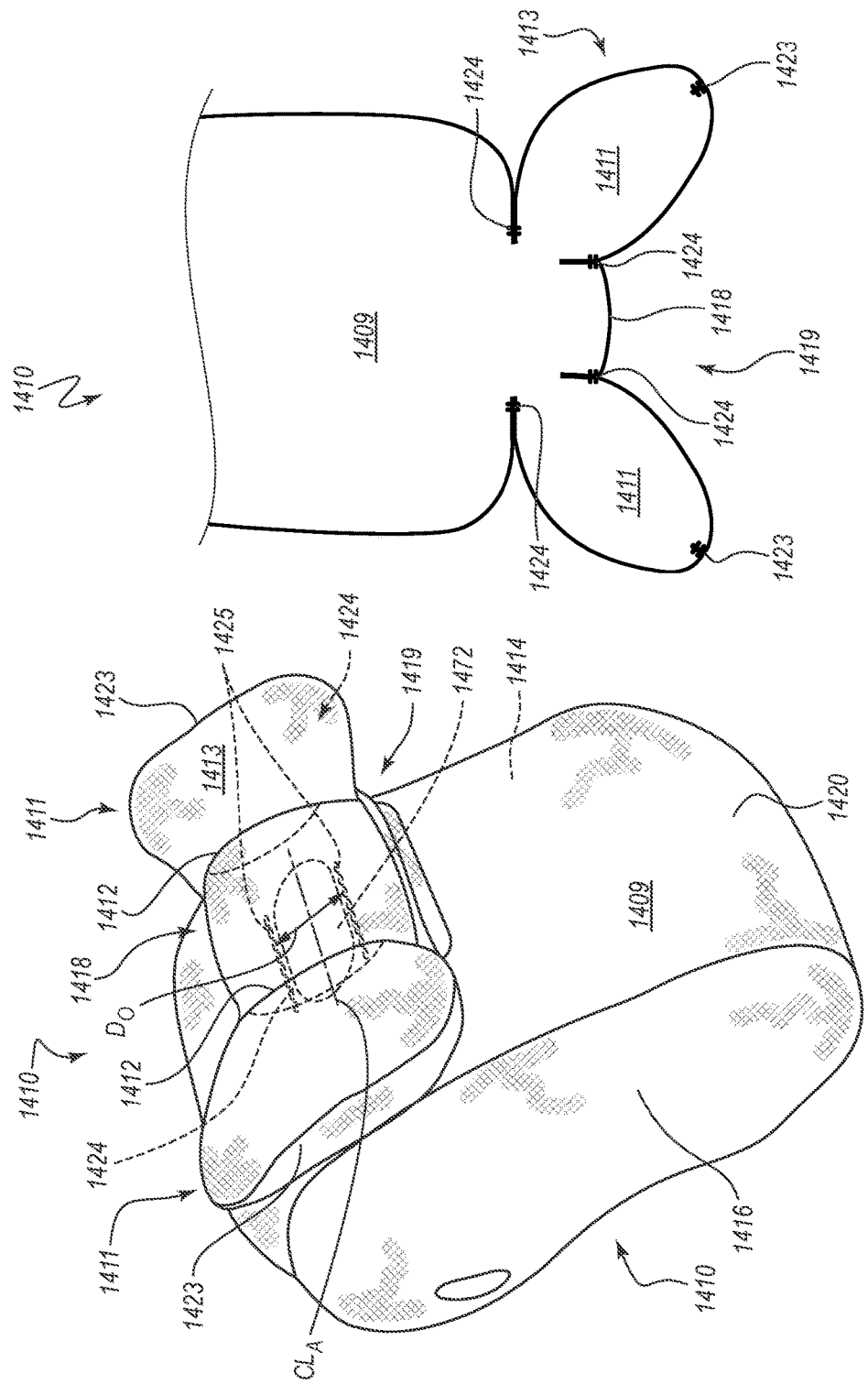

FRONTAL AIRBAG ASSEMBLIES FOR REDUCING ROTATIONAL VELOCITY OF A HEAD OF AN OCCUPANT

TECHNICAL FIELD

The present disclosure relates generally to the field of automotive protective systems. More specifically, the present disclosure relates to inflatable airbag assemblies.

BACKGROUND

Inflatable airbags may be mounted within a vehicle and deployed during a collision event. A deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 14A is a perspective view of an airbag cushion, according to another embodiment of the present disclosure, including a main airbag chamber and "bow-tie" pillow cushion.

FIG. 14B is a top profile view of the airbag cushion of FIG. 14A.

DETAILED DESCRIPTION

Figure 1:
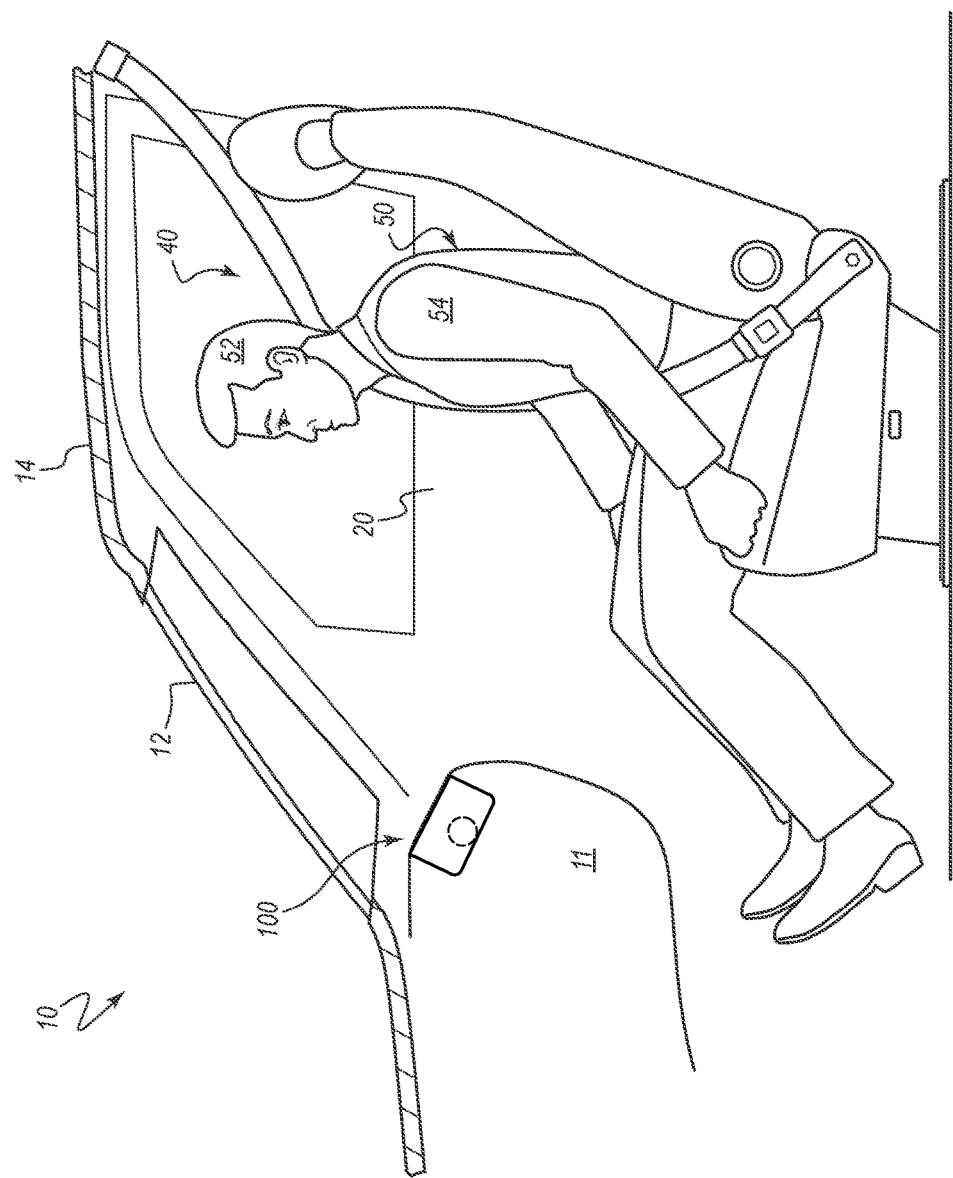
FIG. 1 is a side view of an airbag assembly, according to one embodiment of the disclosure, prior to deployment.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "attached to" refers to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas) can flow from one element to another element when the elements are in fluid communication with each other. The phrase "vehicle seating position" refers to the position in which an occupant is generally positioned when seated in a seat of a vehicle. The term "occupant" refers to a person or crash test dummy within a vehicle. As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill). Unless otherwise stated, all ranges include both endpoints and all numbers between the endpoints.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the airbag housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a dashboard. An airbag assembly can mitigate injury to an occupant of a vehicle during a collision event by reducing the effect of impact of the occupant against structures (body-structure impact) within the vehicle (such as, e.g., a dashboard or door column). While airbag assemblies are useful in mitigating such injuries, occupant impact on an airbag assembly introduces a risk for other injuries. For example, prior to a collision event, an occupant's head is in motion more or less synchronously with the vehicle. During the collision event, the vehicle's direction of travel and speed may be altered severely and abruptly. When such a collision triggers the deployment of an airbag cushion from an airbag assembly, the airbag cushion accelerates in a direction specifically relative to the vehicle. That is, a frontal airbag will deploy nominally rearward from the dashboard. Because the collision event itself has altered the direction of the vehicle's travel, the occupant, even if restrained by a modern three-point harness, may no longer be in synchronous movement with the vehicle. Moreover, the occupant may impact the airbag in such a way that some degree of injury may result from the impact with the airbag, even though this impact mitigates injury from body-structure impacts. For example, an occupant's head may be accelerated rotationally relative to the spine as a result of impacting the airbag. Such rotation acceleration (and, conversely, deceleration) poses risk of injury to the occupant.

Stated otherwise, as the occupant impacts a frontal airbag, the head of the occupant may twist or rotate with significant rotational (i.e., angular) velocity, which can potentially induce injury. For example, as a front-seat passenger travels in a forward direction and strikes a frontal airbag during a collision event, the occupant's head may rotate about a vertical axis (e.g., a z-axis that passes through the top of the head down through the neck of the occupant) and/or a horizontal axis (e.g., a x-axis or a sagittal axis of the head passing through the tip of the nose and back of the head, as if a pivot point of the head when rotating within the coronal plane) with substantial force. While the frontal airbag may effectively limit and/or reduce forward rotation of the head about a y-axis (a frontal axis of the head passing through the ears, as if a pivot point for the head to rotate within the sagittal plane), the frontal airbag may have limited ability to reduce lateral rotation of the head about the z-axis and/or the x-axis. The rotation of the head may be relative to the vehicle and/or relative to a torso or body of the occupant.

A risk of traumatic head/brain injury from rapid rotation of the occupant's head can be reduced by employing airbag systems that reduce the rotational velocity of the occupant's head during a collision event. For example, as described in detail herein, a cushion including protruding lobes can be used to reduce the rotational velocity of the head during a collision event.

Although an airbag system serves to reduce or eliminate injury resulting from the impact of an occupant's body with structures or components of a vehicle, an airbag system may induce injury, or fail to mitigate injury, when the occupant's body is in rotation relative to the vehicle at the moment the occupant impacts the deployed airbag cushion. For example, as noted above, immediately prior to a vehicle collision, the occupant and the vehicle are usually moving approximately synchronously. During a collision, the vehicle may begin to rotate as a result of striking an obstacle or another vehicle. The occupant's body, even if using a modern three-point restraint system, may not begin rotating with the vehicle. The occupant's body may rotate, relative to the vehicle, in a different direction, at a different speed, on a different axis, and so forth. This is particularly true when a vehicle is involved in a multiple collision incident, such as striking or being struck by more than one vehicle, striking/being struck by first a vehicle then a fixed obstacle, rolling, and so forth. As a result, in the short interval between a collision event triggering airbag deployment and impact by the occupant's body on the airbag cushion, the vehicle and occupant are moving asynchronously and may have a substantial degree of rotation relative to each other. A difference in the rotational velocity and angle of the occupant relative to the vehicle may be sufficient to limit performance or effectiveness of the airbag.

Simply stated, at the moment the occupant's body impacts the airbag, the airbag may be unable to adjust to position and movement of the occupant's body, for example in a lateral direction. As a result, the airbag may fail to prevent the occupant's body from striking a structure or component of the vehicle, consequently failing to protect the occupant from injury. Additionally, because the airbag cushion cannot adequately respond to the position and movement of the occupant's body, the airbag cushion may actually cause the occupant's body to rebound into a vehicle structure or component, resulting in injury.

The present disclosure provides embodiments of airbags that may rotate with the position and movement of an occupant's body to more effectively protect the occupant from injury in a collision that induces a significant rotational difference (in velocity and/or angle) between the occupant and the vehicle.

Embodiments disclosed herein may provide increased cushioning and/or protection from rotational motion of the head, leading to improved head injury criterion (HIC) and/or brain injury criterion (BrIC) scores for an occupant involved in a collision event. Embodiments disclosed herein may also provide increased cushioning and/or protection in collisions involving rotational movement of the occupant's body relative to the vehicle.

Advantages of various embodiments will be evident from the following detailed description of the figures.

FIG. 1 is a side view of an airbag assembly 100, according to one embodiment of the disclosure, prior to deployment. The airbag assembly 100 is shown installed in a vehicle 10. The vehicle 10 is equipped with a dashboard (also known as an instrument panel) 11, a windscreen 12, a roof 14, and a side door 20. The vehicle 10 may provide a vehicle seating position 40. The vehicle seating position 40 is a position within the vehicle 10 to accommodate an occupant 50 in a seated, forward-facing position, and may include appropriate accoutrement (e.g., seat, seat back, cushion(s), pad(s), headrest, harness, etc.). In FIG. 1, the occupant 50 is seated in the vehicle seating position 40 facing forward in the vehicle 10, and the airbag assembly 100 is mounted to the dashboard 11. A torso/shoulders 54 and a head 52 of the occupant 50 are in an upright position.

Figure 2:
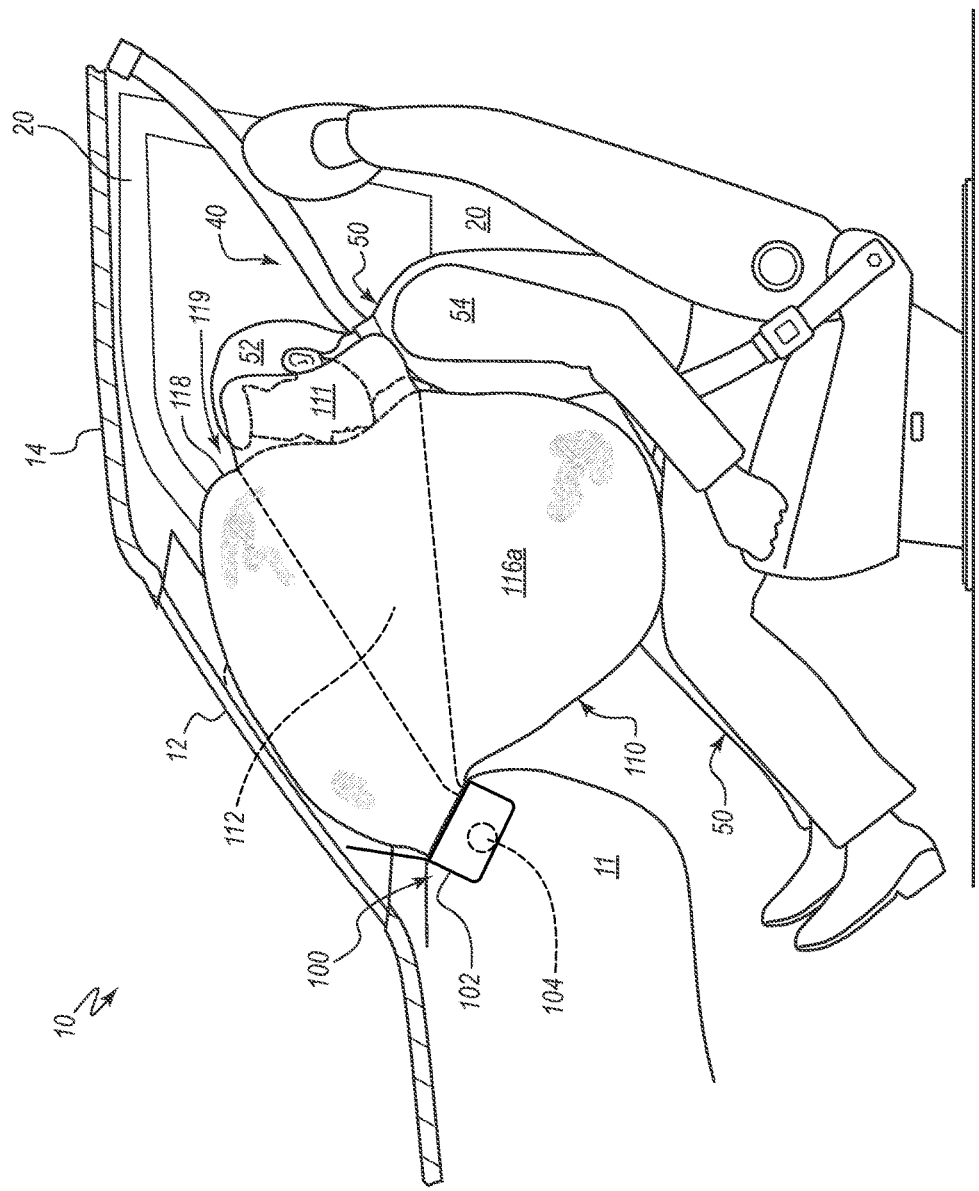
FIG. 2 is a side view of the airbag assembly of FIG. 1 in a deployed state.

FIG. 2 is a side view of the airbag assembly 100 of FIG. 1 in a deployed state. The airbag assembly 100 may include a housing 102, an inflator 104, and an airbag cushion 110 (also known as an airbag or a gas bag). The airbag assembly 100 may be deployed during a collision to provide cushioning and protection to the occupant 50. Collision sensors may trigger deployment of the airbag assembly 100.

The airbag housing 102 may be of any suitable variety, and may include or otherwise be coupled with a cover (not shown), behind which the airbag cushion(s) 110 may be stored in an undeployed state. The airbag housing 102 is mounted in the vehicle 10. The cover may be of any suitable variety, and may include a tear seam or burst seam through which the airbag cushion(s) 110 may deploy. The airbag housing 102 may be mounted within and fixed to, or be in a fixed position relative to, the instrument panel 11 (also known as a dashboard) of the vehicle 10 in any suitable manner.

The inflator 104, a unit or subsystem comprising one or more inflators and pertinent wiring, ducting, etc. (not depicted), may be configured to release inflation gas to inflate the airbag cushion 110. For example, the inflator 104 may be configured to deliver inflation gas through a throat of the airbag cushion 110. The inflator 104 may be configured to initiate inflation of the airbag cushion 110 upon any suitable previously determined events, such as a collision.

The airbag cushion 110 may be manufactured in any suitable manner, such as via one-piece weaving, "cut-and-sew" techniques, or a combination of these and/or other methods. In some embodiments, the airbag cushion 110 may be formed by arranging panels that may be attached or otherwise coupled to one another at seams to form an inflatable chamber. Seams may be formed by stitching, gluing, taping, radio frequency (RF) welding, ultrasonic welding, heat bonding, and/or any other suitable technique or combination of techniques. In other embodiments, the airbag cushion 110 may be formed from a single unitary piece of material, such as, for example, by a one-piece weaving technique, which may incorporate suitable cuts, folds, seams, or other methods to allow formation of an inflatable chamber.

The airbag cushion 110 of FIG. 2 may include a central panel 118 (or main panel) and one or more additional panels coupled to the central panel 118 to form an inflatable chamber. In FIG. 2, the additional panels include a pair of lateral panels 116, such as an outboard lateral panel (not shown in FIG. 2, but see FIG. 3A) and an inboard lateral panel 116a (generally and collectively 116). The inboard lateral panel 116a faces inboard toward the interior of the vehicle 10 and the outboard lateral panel (not shown in FIG. 2, but see FIG. 3A) faces outboard toward the side door 20 of the vehicle 10. The inboard lateral panel 116a may provide a first lateral face and the outboard lateral panel may provide a second lateral face. These lateral faces are further described below. In a deployed inflated state, rear-facing portions of the panels 116, 118 may form an occupant-facing surface 119 which may comprise approximately the exterior rear surface of the airbag cushion 110 between the rear-most portion of each of the lobes 111 on either side. In a deployed inflated state, the occupant-facing surface 119 is positioned forward of the vehicle seating position 40 to receive the occupant 50, and more particularly the head 52 of the occupant 50 travelling in a generally forward direction relative to the vehicle 10. One or more additional faces may adjoin to the lateral faces of the lateral panels 116. That portion of the occupant-facing surface 119 which is congruent with the central panel 118 may provide a substantially flat surface to receive the head 52 of the occupant 50.

The airbag cushion 110 may be configured to receive a front side of the head 52 of the occupant 50 during a collision event. When inflated, the airbag cushion 110 may be disposed directly forward of the vehicle seating position 40. In FIG. 2, the occupant 50 is in a typical or expected upright position about to impact the deployed airbag cushion 110. The airbag cushion 110 has been deployed from the airbag assembly housing 102 by operation of the inflator 104. The deployed airbag cushion 110, as shown in this embodiment, includes a lobe 111 on either side of the head 52 of the occupant 50, and two internal vertical tethers 112. Each of the two lobes 111 is at least partially formed by a part of the respective lateral panel 116 (inboard or outboard) and at least partially formed by the central panel 118. The central panel 118 may comprise a central receiving area to provide a substantially flat impact surface to receive the head 52 of an occupant 50 during a collision event. Because the lobes 111 are contiguous to their respective lateral panels 116, during inflation of the airbag cushion 110 the lobes 111 may achieve the same or nearly the same internal pressure and fabric tension as the lateral panels 116. Each tether 112 couples at an internal forward surface or portion of the airbag cushion 110, and at an interior surface of the occupant-facing surface 119 of the airbag cushion 110. The tethers 112 draw or otherwise configure the occupant-facing surface 119 and/or the lobes 111 to receive the head 52 of the occupant 50 in order to limit rotational velocity of the head 52, as will be described more fully below. In certain embodiments, the airbag cushion 110 may not rest against the windscreen 12 and/or the roof 14 after deployment and before impact by the occupant 50.

Figure 3A:
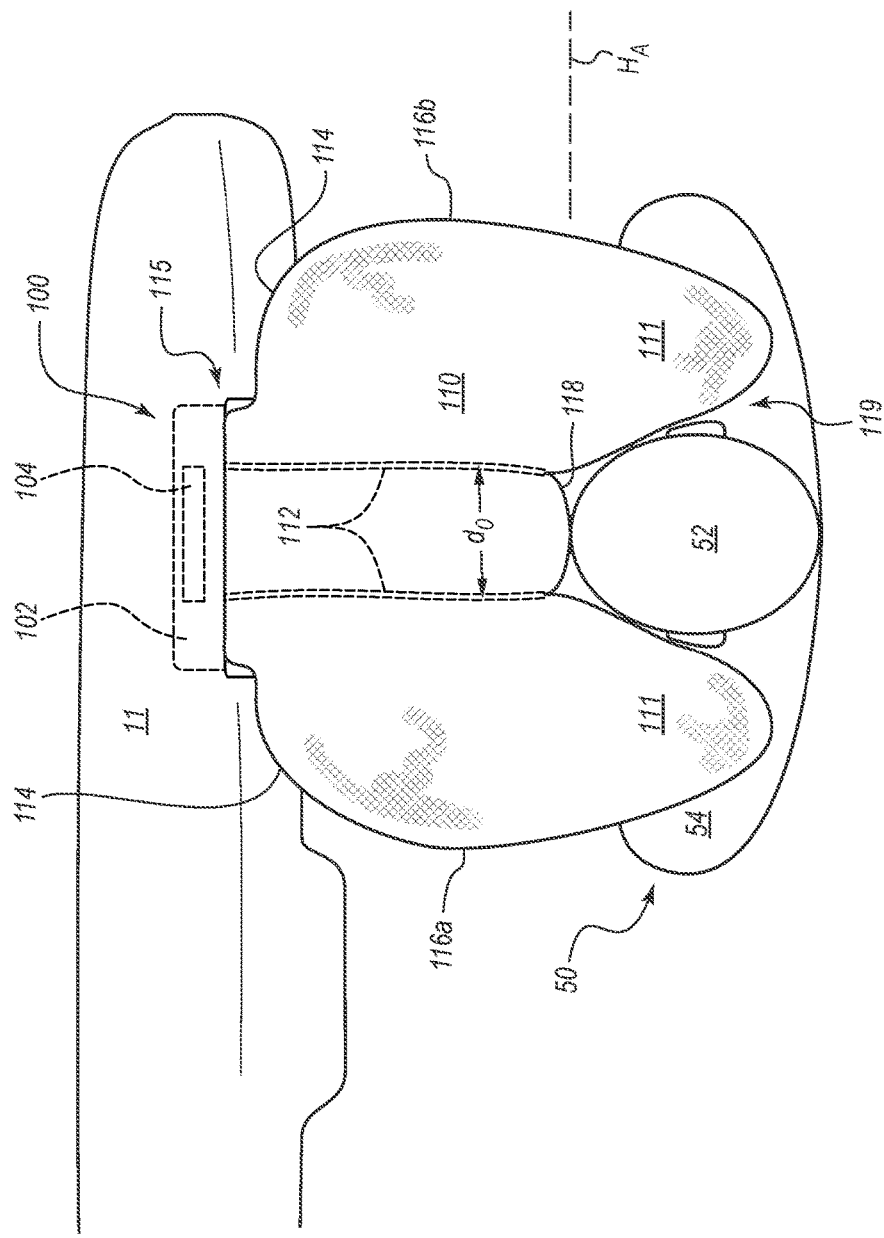
FIG. 3A is a top view of the airbag assembly of FIG. 1 in a deployed state prior to impact by the occupant, similar to FIG. 2.

FIG. 3A is a top view of the airbag assembly 100 in a deployed state prior to impact by the occupant 50, similar to FIG. 2. In FIG. 3A, the airbag cushion 110 has been deployed from the airbag assembly housing 102 by operation of the inflator 104. The airbag housing 102 is part of an airbag assembly 100, which is mounted to the instrument panel 11 of the vehicle. The airbag cushion 110 includes the two lobes 111, each of which extends rearward on or from the occupant-facing surface 119 on either side of the head 52 of the occupant 50 and above the torso/shoulders 54. As noted previously, the occupant-facing surface 119 may be the exterior rear surface of the airbag cushion 110 generally from the rearmost point of the inboard lateral panel 116a and along the surface of the inboard lateral panel 116a to and across the surface of the rear-facing portion of the central panel 118 and the surface of the outboard lateral panel 116b to the rearmost point of the outboard lateral panel 116b. The inboard lateral panel 116a faces inboard toward the interior of the vehicle, and the outboard lateral panel 116b faces outboard toward a side door (not depicted) of the vehicle. The central panel 118 may provide a substantially flat surface as part of the occupant-facing surface 119.

The airbag cushion 110 includes two internal tethers 112, which facilitate deployment and formation of the two lobes 111. The tethers 112 are secured at the occupant-facing surface 119 at an offset distance $d_o$ along a horizontal axis $H_A$ of the airbag cushion 110. The tethers 112 are secured at an interior portion of the airbag cushion 110 at a forward location within the airbag cushion 110 and also secured at an interior surface of the occupant-facing surface 119. The tethers 112 extend from the forward portion rearward through the interior of the airbag cushion 110 (e.g., through an inflatable chamber of the airbag cushion 110). The forward or first end of each tether 112 attaches to an internal surface of its respective lateral (side) panel 116. One tether 112 may attach at a forward internal surface of the inboard lateral panel 116a, while the other tether 112 may attach at a forward internal surface of the outboard lateral panel 116b. Each tether 112 may then angle rearward and somewhat upward through the interior of the airbag cushion 110. Each tether 112 has a rear (or second) end which may attach at the internal surface of the occupant-facing surface 119 of the airbag cushion 110.

The tethers 112 are vertical tethers because a connection at the occupant-facing surface 119 (or rear face) extends generally vertically, or generally up and down from a top portion of the occupant-facing surface 119 toward a bottom portion of the occupant-facing surface 119.

As the tethers 112 are drawn taut during inflation and expansion of the airbag cushion 110, the tethers 112 draw a central portion of the occupant-facing surface 119, proximally fixing the central portion of the occupant-facing surface 119, while the pair of lobes 111 deploy further rearward on either side of the occupant-facing surface 119 and on either side of the head 52 of the occupant 50. As the tethers 112 draw and position the occupant-facing surface 119, at least one low tension zone or bubble may be created within the central portion of the occupant-facing surface 119. The low fabric tension zone(s) may reduce a possibility of the airbag cushion 110 inducing rotation of the head 52.

The tethers 112, the lateral panels 116, and the central panel 118 may be constructed and attached to each other in such a manner as to provide a specific configuration of high and low fabric tension zones in the occupant-facing surface. As the tethers 112 draw taut, they may provide a specific configuration to the occupant-facing surface 119 and position the occupant-facing surface 119 of the airbag cushion 110. The tethers 112 may, in particular, facilitate the formation of high fabric tension zones on that portion of the occupant-facing surface 119 which is part of each of the lobes 111. The tethers 112 may also facilitate the formation of a low fabric tension zone in that portion of the occupant-facing surface 119. The low fabric tension zone may be positioned on the rear-facing surface of the central panel 118. The combination of high fabric tension zones in the occupant-facing surfaces of the lobes 111, and a low fabric tension zone in the occupant-facing surface of the central panel 118 may reduce or mitigate rotation of a head 52 of an occupant 50. Stated otherwise, the low fabric tension zone may be situated between the high fabric tension zone on the occupant-facing surfaces of the lobes 111. This configuration of a low fabric tension zone between high fabric tension zones may, upon impact of the head 52 of the occupant 50, assist in preventing or reducing rotation of the head 52.

The lobes 111 may provide a high tension fabric zone on the occupant-facing surface of each lobe 111. The high fabric tension zone on either lobe 111 (or on both) may reduce or limit rotation of the head 52. The high fabric tension zone provides support to prevent or limit the occupant 50 from breaking through (travelling through) the lobes 111. The lobes 111 may receive and/or contact or engage the head 52 of the occupant 50 and provide support to the sides of the head 52 so as to counteract forces on the head 52 that may cause rotation of the head 52.

In embodiments involving the lobes 111, the tethers 112, and the ability of the airbag cushion 110 to rotate with the occupant 50, the airbag cushion 110 may more effectively absorb and dissipate the momentum of the occupant 50 so as to mitigate impact by the occupant 50 with internal structures or components of the vehicle and thereby reduce or eliminate injury to the occupant 50, and more particularly, the head 52. This rotation of the airbag cushion 110 may also reduce or eliminate the possibility that the airbag cushion 110 could cause the occupant 50 to rebound from the airbag cushion 110 into a structure or component of the vehicle or into another occupant. This configuration may also allow the occupant-facing surface 119 and lobes 111 to more effectively limit rotation of the head 52 of the occupant 50 and reduce potential head injury criterion (HIC) and/or brain injury criterion (BrIC).

In certain embodiments, each of the lateral panels 116 may be formed so as to create a curvilinear symmetric taper 114 to produce a semicircular forward profile of the airbag cushion 110. The curvilinear symmetric taper 114 of the lateral panels 116 of FIG. 3A produce rounded forward corners of the airbag cushion 110. In still other embodiments, the symmetric taper 114 of the lateral panels 116 may be less curvilinear such that the airbag cushion 110 obtains a generally triangular profile (e.g., a triangular symmetric taper). In embodiments of a triangular symmetric taper at the forward profile, an apex of the triangle is forward, at or near the dashboard 11, and the base of the triangle is rearward, toward the occupant seating area (not depicted, but see 40 in FIGS. 1 and 2). A symmetric tapering cross-section at a forward portion of the inflatable airbag allows rotation of the airbag together with a head and torso of the occupant to reduce head rotation relative to the torso of the occupant.

The dashboard 11 has a generally flat face rearward which may interact with the airbag cushion 110. This interaction between the dashboard 11 and the airbag cushion 110 supports the airbag cushion 110 as the occupant 50 impacts the airbag cushion 110 in a collision event and during ride down of the occupant 50. When a collision event involves only forward movement of the vehicle and the occupant 50, the dashboard 11 supports the airbag cushion 110 which supports the occupant 50 and mitigates the deceleration of the occupant 50.

When a collision event involves rotation of an occupant relative to the vehicle, presently available airbag cushions, which do not include a symmetric taper 114 at the forward profile according to the disclosures herein, may not adequately support and decelerate the occupant, or may cause the occupant to rebound into a vehicle structure or component and produce injury.

By contrast, the airbag cushion 110 may rotate with the occupant 50 because the symmetric taper 114 at the forward profile may allow the airbag cushion 110 to "roll" or rotate to a limited degree (to the right or to the left) along the rear surface of the dashboard 11. A symmetric taper 114 of the forward aspect of the airbag cushion 110 may be positioned at an anchor point 115 for the airbag cushion 110 at the dashboard 11 at or near the airbag housing 102. A symmetric taper 114 (as compared to an asymmetric taper) may prevent the airbag cushion 110 from rotating prior to contact by the occupant 50. Prior to the occupant 50 impacting the airbag cushion 110, the deployed and inflated airbag cushion 110 may have little or no contact with the dashboard 11 to either side of the anchor point 115 at or near the airbag housing 102, which may permit the airbag cushion 110 to rotate around the anchor point 115 at or near the airbag housing 102 in conformity with lateral and/or rotational movement of the occupant 50.

Figure 3B:
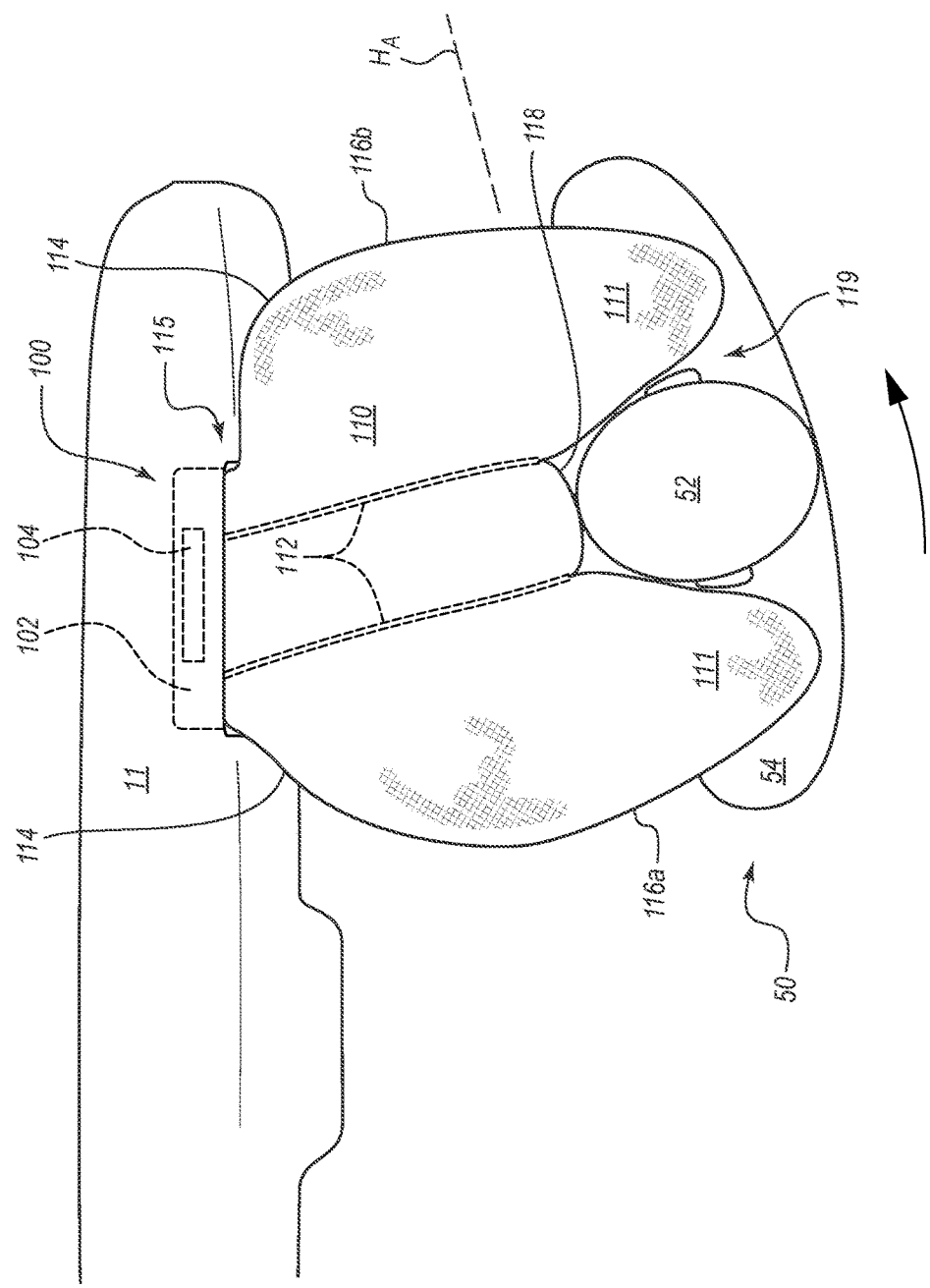
FIG. 3B is a top view of the airbag assembly of FIG. 3A after the occupant has impacted the fully deployed and inflated airbag cushion.

FIG. 3B is a top view of the airbag assembly 100 of FIG. 3A in which an occupant 50 has impacted the fully deployed and inflated airbag cushion 110. In FIG. 3B, the occupant 50 is rotating to the right and counterclockwise relative to the anchor point 115 and/or the vehicle. The airbag cushion 110 is displaced by the movement of the occupant 50 as the occupant 50 impacts the airbag cushion 110. According to this embodiment, the outboard lateral panel 116, due to its forward rounded corner 114 and the constraint of the anchor point 115, may be able to rotate forward and outboard (counterclockwise) in response to movement of the occupant 50 (e.g., both forward and lateral relative to the vehicle) with no significant change of pressure or deformation. Similarly, the inboard lateral panel 116a may be able to rotate rearward and outboard (counterclockwise) in conformity to a lateral component of the movement of the occupant 50 relative to the vehicle with no significant change of pressure or deformation. That is, as an integrated unit, the symmetric taper 114 of the inboard and outboard lateral panels 116 may allow the airbag cushion 110 to rotate to a certain degree around an anchor point 115 to accommodate a lateral component of movement and energy of the occupant 50 with no significant change of pressure and/or significantly deforming and failing to protect the occupant 50. The rotation capability of the airbag cushion 110 enabled by the symmetric taper 114 at the forward portion can reduce a likelihood of the occupant's 50 lateral movement and energy overcoming the pressurization of the lobe 111 and thereby collapsing the lobe 111. Stated differently, rotation of the airbag cushion 110 responsive to a lateral component of movement of the occupant 50 can facilitate the airbag cushion 110 maintaining the occupant 50 between the lobes 111 to reduce rotational velocity of the head 52 of the occupant 50.

While FIG. 3B depicts the occupant 50 moving forward and laterally toward the right side of the vehicle producing counterclockwise rotation of the airbag cushion 110, the same functionality of the symmetric taper 114 and anchor point 115 of the airbag cushion 110 may be present in an incident involving forward and lateral movement of the occupant 50 in another direction, such as clockwise. This rotational functionality may be provided in embodiments including a symmetric taper 114, such as a semicircular forward profile, a rounded-corner forward profile, or a triangular forward profile having its apex at or near the anchor point 115.

Figure 4B:
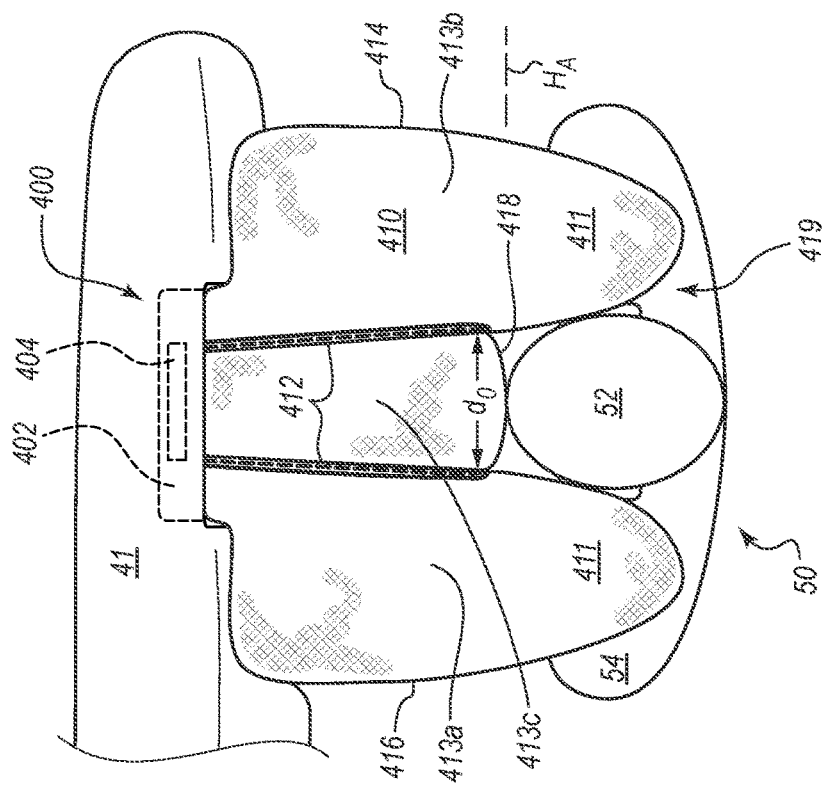
FIG. 4B is a top view of the airbag assembly of FIG. 4A after impact by the occupant.
Figure 4A:
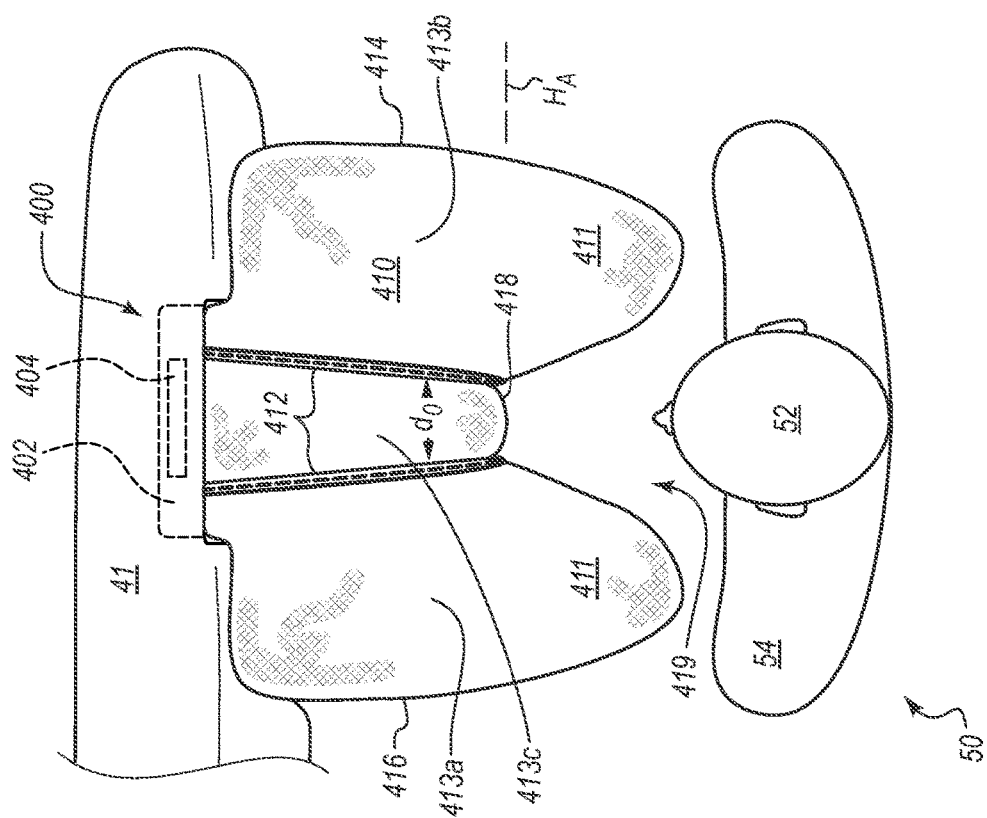
FIG. 4A is a top view of an airbag assembly having multiple distinct inflatable chambers, according to another embodiment of the present disclosure.

FIG. 4A is a top view of another embodiment of an airbag assembly 400 according to the present disclosure. The airbag assembly 400 may include an airbag housing 402, an inflator 404, and an airbag cushion 410. The airbag housing 402 may be mounted to a dashboard 41 (or instrument panel) of a vehicle. The inflator 404 (e.g., a unit or subsystem which may include one or more inflators and pertinent wiring, ducting, etc.) may be configured to release inflation gas to inflate the airbag cushion 410 upon a suitable triggering event, such as a collision. An occupant 50 is shown in an vehicle seating position. In FIG. 4A, the airbag cushion 410 has been fully deployed and inflated by operation of the inflator 404 such that it is disposed forward of an vehicle seating position. The occupant 50 has not contacted the airbag cushion 410. The airbag cushion 410 includes three distinct inflatable chambers 413a, 413b, 413c. In some embodiments, each of the distinct inflatable chambers 413a, 413b, 413c may be formed by single-piece construction, for example, one-piece weaving. In other embodiments, the distinct inflatable chambers 413a, 413b, 413c may be formed by multiple panel construction. Any appropriate construction method may be used, for example, cutting, sewing, folding, overlapping, etc. The distinct inflatable chambers 413a, 413b, 413c are coupled at seams 412. The inflatable chambers 413a, 413b, 413c may be divided from each other by isolating fabric panels (also) 412, further described below. The seams 412 may be formed by any suitable means, for example, gluing, sewing, taping, RF welding, ultrasonic welding, etc.

The airbag cushion 410 includes a pair of lobe chambers 413a, 413b, and a central occupant impact chamber 413c (or central chamber) disposed between the pair of lobe chambers 413a, 413b. The lobe chambers 413a, 413b each includes a lobe 411 which, when the airbag cushion 410 is inflatable, extend rearward to either side of the head 52 and over the torso/shoulders 54 of the occupant 50. Between the lobe chamber 413a and the central chamber 413c is at least one isolating fabric panel 412 to isolate the interior of these two chambers 413a, 413c from each other. The isolating fabric panel 412 may be contiguous to and a part of either the lobe chamber 413a or the central chamber 413c, or both chambers 413a, 413c may include an isolating fabric panel between them. Similarly, the lobe chamber 413b and the central chamber 413c have at least one isolating fabric panel 412 between them. The isolating panels 412 may permit the inflatable chambers 413a, 413b, 413c to be inflated to the same pressure, or to different pressures. The isolating panels 412 may also prevent or mitigate deformation which may result from inflation gases being displaced to a different chamber.

As the airbag cushion 410 inflates, the isolating panels 412 draw taut and configure an occupant-facing surface 419 to present lobes 411 on either side of the airbag cushion 410. The occupant-facing surface 419 may include portions of the external surface of the airbag cushion 410 from the rearmost part of one lobe chamber 413a to and across the rear-facing portion 418 of the central chamber 413c and to the rearmost part of the opposite lobe chamber 413b. The isolating panels 412 may cause a specific configuration of high and low fabric tension zones in the occupant-facing surface 419. Specifically, the isolating panels 412 may configure a high fabric tension zone in the surface of each of the lobes 411 of the lobe chambers 413a, 413b which are part of the occupant-facing surface 419. The high fabric tension zone on the occupant-facing portion of either lobe 411 (or on both) may reduce or limit rotation of the head 52 of an occupant 50. The high fabric tension zones provide support to prevent or limit the occupant 50 from breaking through (traveling through) the lobes 411. The lobes 411 may receive and/or contact or engage the head 52 of the occupant 50 and provide support to the sides of the head 52 so as to counteract forces on the head 52 that may cause rotation of the head 52. The high fabric tension zones in the occupant-facing surfaces of the two lobe chambers 413a, 413b may limit, reduce, or mitigate rotation of the head 52 of the occupant 50. The isolating panels 412 may also cause a low fabric tension zone in the rear surface of that portion of the central chamber 413c which is part of the occupant-facing surface 419. The low fabric tension zone in the occupant-facing surface 419 at the central chamber 413c may receive the impact of the head 52 of the occupant 50. Stated otherwise, the isolating panels 412 may form an occupant-facing surface 419 having a low fabric tension zone at or near its center with high fabric tension zones adjacent to it. The isolating panels 412 may serve to allow a lower inflated pressure of the central chamber 413c as compared to the two lobe chambers 413a, 413b. In some embodiments, the airbag inflator 404 may introduce gases directly into the central chamber 413c at a lower pressure than into the lobe chambers 413a, 413b. In other embodiments, the airbag inflator 404 may introduce inflation gases only into the lobe chambers 413a, 413b, and inflation gases may then pass from the lobe chambers 413a, 413b in a limited manner into the central chamber 413c to produce a lower pressure in the central chamber 413c than in the lobe chambers 413a, 413b. The isolating panels 412 may prevent or limit communication of inflation gases between the chambers 413a, 413b, 413c. In an embodiment in which the central chamber 413c is inflated to a lesser degree (a lower pressure) than the lobe chambers 413a, 413b, the isolating panels 412 may prevent the higher pressure inflation gases in the lobe chambers 413a, 413b from intermingling with the inflation gases in the central chamber 413c. A lower pressure in the central chamber 413c may establish a particular width, or offset distance $d_o$ at the indicated horizontal axis $H_A$ of the rear-facing portion 418 of the central chamber 413c. The lower pressure in the central chamber 413c may also assist in forming the low fabric tension zone in the rear-facing portion 418 of the central chamber 413c. In the embodiment shown, the offset distance $d_o$ at the horizontal axis $h_a$ is narrower than the width between the forward attachment points of the isolating panels 412. This offset distance $d_o$ may change as a result of contact by the head 52 of the occupant 50, as described below. This configuration may permit the airbag cushion 410 to reduce or limit rotation of the head 52 of an occupant 50. This configuration may also reduce the possibility of the airbag cushion 410 causing the head 52 of the occupant 50 to rebound from the airbag cushion 410.

FIG. 4B is a top view of the airbag assembly 400 of FIG. 4A in a deployed state and having been impacted by the occupant 50. In at least one embodiment, the offset distance $d_o$ at the horizontal axis $h_a$ may change due to contact with the head 52 of the occupant 50. As the head 52 of the occupant 50 impacts the occupant-facing surface 419 (e.g., the rear-facing portion 418 of the central chamber 413c), the rear-facing portion 418 of the central chamber 413c may deform to a degree as the head 52 of the occupant 50 impacts the rear-facing portion 418 until the pressure in the central chamber 413c is approximately equal to the pressure in the lobe chambers 413a, 413b. This intentional deformation of the rear-facing portion 418 of the central chamber 413c may cause the offset distance $d_o$ at the horizontal axis $h_a$ to change. A configuration of lower pressure/low fabric tension of the rear-facing portion 418 of the central chamber 413c and higher pressure/high fabric tension zones of the lobes 411 may permit the airbag cushion 410 to receive the head 52 of the occupant 50 more securely between the lobes 411 of the lobe chambers 413a, 413b and reduce, limit or mitigate rotation of the head 52 of an occupant 50.

Figure 5:
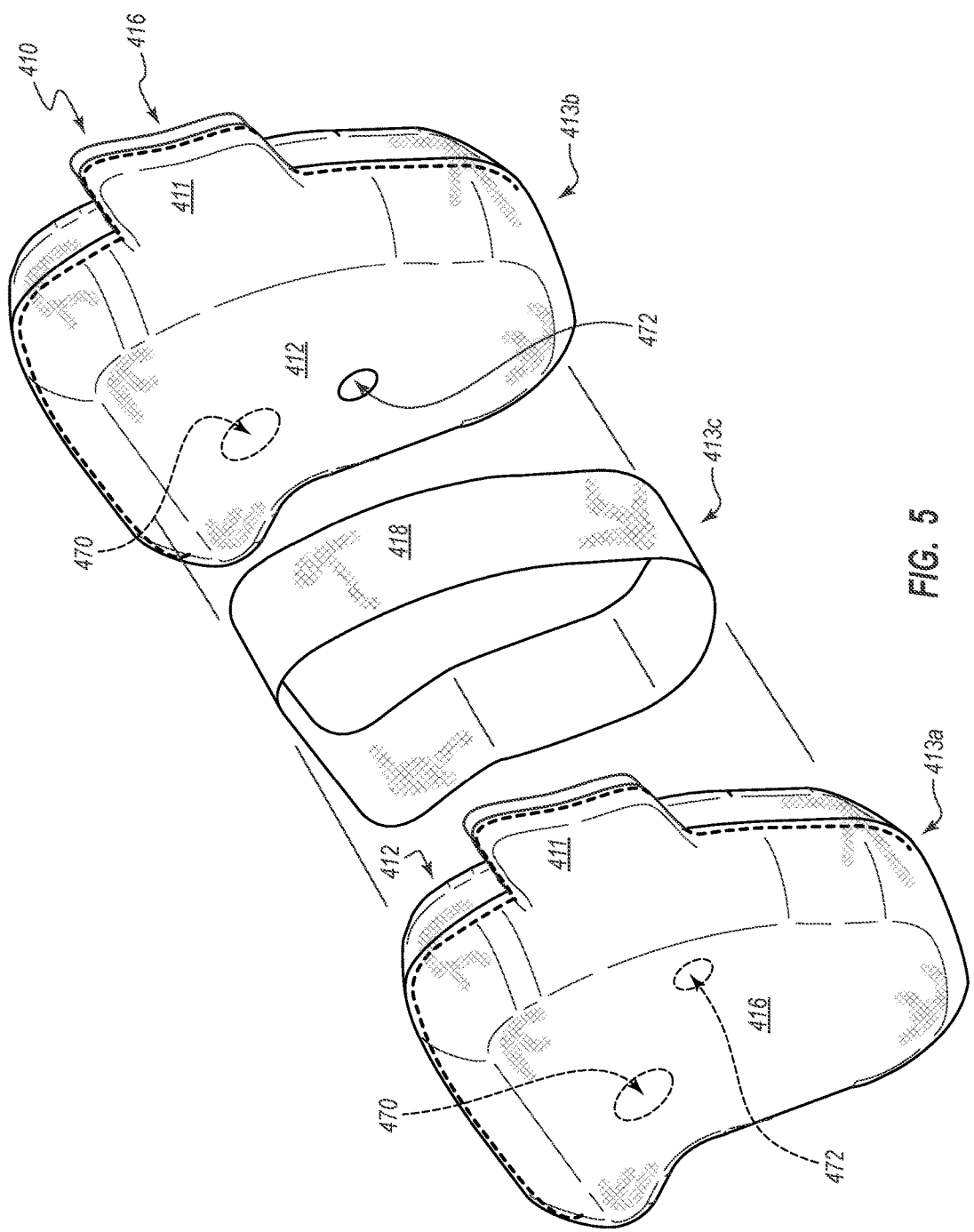
FIG. 5 is an exploded view of the airbag cushion of FIGS. 4A and 4B.

FIG. 5 is an exploded view of the airbag cushion 410 of FIGS. 4A and 4B. The airbag cushion 410 includes of at least an inboard and outboard lobe chamber 413a, 413b and a central chamber 413c. In the embodiment shown, the central chamber 413c of the airbag cushion 410 has no side surfaces. The lobe chambers 413a, 413b each have a lobe 411, an isolating panel 412 (or central chamber-adjoining side panel) which couples with the central chamber 413c, and a lateral side panel 416 disposed on an opposing side of the central chamber 413c. In some embodiments, the lobe chambers 413a, 413b also have an inlet valve 470 (or aperture) through which inflation gases may be admitted to the lobe chambers 413a, 413b from an inflator (not depicted). In at least one embodiment, the inlet valves 470 may be one-way valves such that inflation gases cannot revert flow (or backflow) from the lobe chambers 413a, 413b out of the valves 470 toward the inflator. In other embodiments, the inlet valves 470 may permit inflation gases to flow back toward the inflator (not depicted) under predetermined conditions (e.g., reaching a predetermined target inflation pressure, or a predetermined time following inflation, etc.). In still other embodiments, the inlet valves 470 may be replaced with or augmented by baffles to limit, prevent, or control the flow of inflation gases. In the embodiment of FIG. 5, the isolating panel 412 of each lobe chamber 413a, 413b may contain a communication valve 472 (or baffle or aperture) to permit inflation gases to flow from the two lobe chambers 413a, 413b into the central chamber 413c. In at least one embodiment, the two communication valves 472 may be pressure limiting such that gases do not flow from the lobe chambers 413a, 413b until a predetermined pressure is attained within the lobe chambers 413a, 413b. In at least one embodiment, the two communication valves 472 may be pressure limiting by allowing inflation gases to flow from the lobe chambers 413a, 413b into the central chamber 413c until a predetermined pressure is attained in the central chamber 413c. In some embodiments, the two communication valves 472 may be one-way valves and only permit inflation gases to flow from the lobe chambers 413a, 413b into the central chamber 413c. In some embodiments, the communication valves 472 may be supplanted or augmented with baffles or other means of controlling the communication of inflation gases between the lobe chambers 413a, 413b and the central chamber 413c.

The central chamber 413c may include a head receiving area or rear facing portion 418 constituting a portion of the occupant-facing surface 419 described in FIG. 4A. The head receiving area 418 may be positioned during inflation to receive a front side (e.g., face, forehead) of an occupant's head (not depicted). The combination of the inlet valves 470 supplying inflation gases to the airbag cushion 410 initially into the lobe chambers 413a, 413b, the isolating panels 412, and the communication valves 472 may serve to provide appropriate inflation pressures of each of the respective chambers 413a, 413b, 413c so that the occupant-facing surface (419 in FIGS. 4A, 4B) is configured with a low fabric tension zone in the head receiving area 418 of the central chamber 413c and high fabric tension zones in the occupant-facing surfaces of the lobes 411 of the lobe chambers 413a, 413b.

Figure 6:
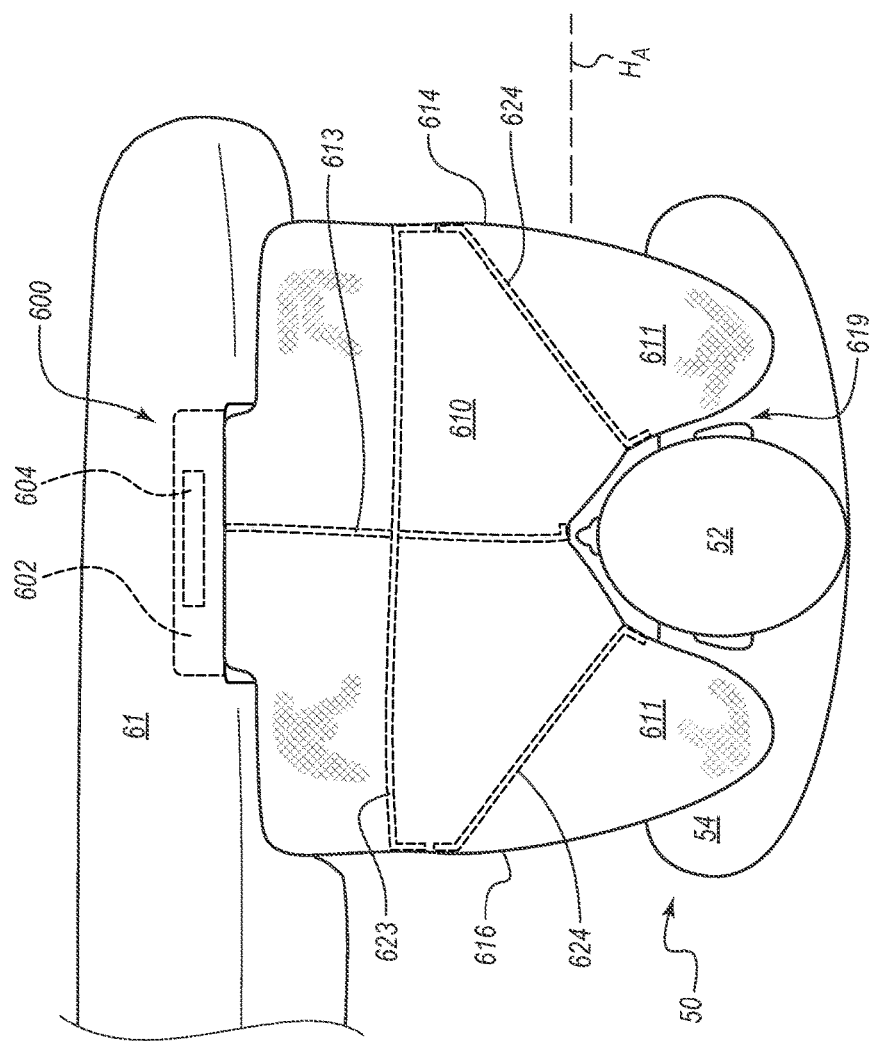
FIG. 6 is a top view of an airbag assembly, according to another embodiment of the present disclosure, that may be similar to the airbag assembly of FIG. 3A and has an alternate configuration of internal tethers.

FIG. 6 is a top view of an airbag assembly 600 similar to the airbag assembly 100 of FIG. 3A and having an alternate configuration of internal tethers 613, 623, 624. An airbag cushion 610 is in a deployed inflated state, and shown immediately prior to contact with the head 52 of the occupant 50. The airbag cushion 610 includes two lobes 611 deployed to either side of the head 52 of the occupant 50. The airbag cushion 610 may include an inboard lateral panel 616 disposed toward the interior of the vehicle, and an outboard lateral panel 614 disposed toward the exterior of the vehicle. An occupant-facing surface 619 may be created on the rear-facing portion of the airbag cushion 610 from the rear-most part of the lobe 611 on one side, along the surface of that lobe 611 toward and across the surface of the central rear-facing section of the airbag cushion 610 and continuing across the surface of and to the rear-most part of the lobe 611 on the opposite side. Internal to the airbag cushion 610 may be a combination of tethers 613, 623, 624. The internal tether 613 may be a single vertical tether with a first end coupled at a forward surface of the airbag cushion 610 or airbag assembly 600, and with a second end coupled at a rear interior surface of the airbag cushion 610 at or near the center of the occupant-facing surface 619. The internal lateral tether 623 may be a vertical tether with a first end coupled to an interior surface of the inboard lateral panel 616 and a second end coupled to an interior surface of the outboard lateral panel 614. The two internal diagonal tethers 624 may each be disposed within one lobe 611. The inboard internal diagonal tether 624 may be a vertical tether with a first end coupled to an interior surface of the inboard lateral panel 616, and a second end coupled to an interior surface of the occupant-facing surface 619 and inboard of the couple point of the internal tether 613. The outboard internal diagonal tether 624 may be a vertical tether with a first end coupled to an interior surface of the outboard lateral panel 614, and a second end coupled to an interior surface of the occupant-facing surface 619 and outboard of the couple point of the internal tether 613. As the airbag cushion 610 inflates and deploys, the internal tethers 613, 623, 624 may be drawn tight and may provide support to the airbag cushion 610 in such a way as to form the two lobes 611 and the occupant-facing surface 619. Specifically, the internal tether 613 may configure or otherwise position a center of the occupant-facing surface 619 in front of an occupant 50 prior to contact by the head of the occupant 50. The internal lateral tether 623 may provide support to the inboard and outboard lateral panels 616, 614 and may assist in preventing the occupant 50 from traveling through the lobes 611. The internal diagonal tethers 624 may provide specific shape to the occupant-facing surface 619 to form a receiving area for the head 52 of the occupant 50. In some embodiments, the internal tethers 613, 624 may configure the occupant-facing surface 619 of the airbag cushion 610 so as to form a pocket shape to receive the head 52 of the occupant. The combination of the internal tethers 613, 623, 624 may provide for the formation of at least one low fabric tension zone in the occupant-facing surface 619. The combination of the internal tethers 613, 623, 624 may provide for the formation of corresponding high fabric tension zones in the lobes 611. The high fabric tension zones in the lobes 611 may prevent the occupant 50 from traveling through the lobes 611 and striking an internal structure of the vehicle. The low fabric tension zone(s) in the occupant-facing surface 619 may receive the head 52 of an occupant 50 and reduce or limit rotational speed of the head 52 of an occupant 50, and may thereby reduce the likelihood of injury or reduce the degree of injury to the head 52. While the embodiment shown does not incorporate a symmetrical taper of the forward portion of the airbag cushion 610, a symmetrical taper may be present in other embodiments.

Figure 7:
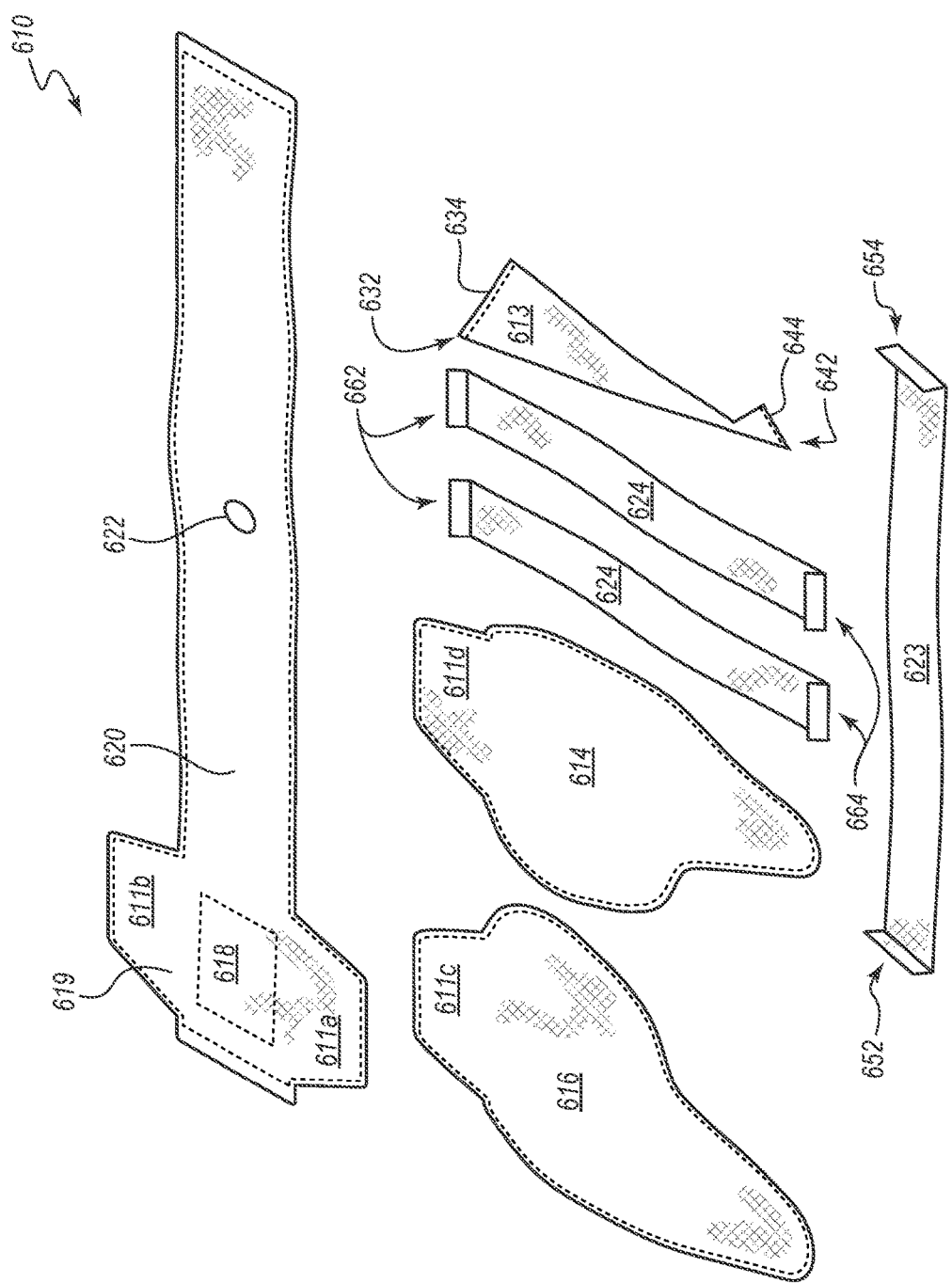
FIG. 7 is a component view of the airbag cushion of FIG. 6.

FIG. 7 is a component view of the airbag cushion 610 of FIG. 6. The main panel 620 of the airbag cushion 110 incorporates flaps 611a, 611b of the lobes 611 shown in FIG. 6. The main panel 620 may include an inflator port 622 or other provision to facilitate inflation of the airbag cushion 610. In this embodiment, the main panel 620 includes a lobe-forming flap 611a which is to be positioned inboard relative to the occupant, and a lobe-forming flap 611b which is to be positioned outboard relative to the occupant, and which help to form the inboard and outboard lobes 611, respectively. The main panel 620 has an occupant-facing surface 619 including a rear face 618 and the occupant-facing lobe-forming flaps 611a, 611b. The occupant-facing surface 619 may receive the face of an occupant during a collision event. Inboard and outboard lateral panels 616, 614 help form the shape of the airbag cushion 610, and are surfaces of the airbag cushion 610 located, respectively, on the inboard (facing toward the center of the vehicle) and outboard (facing toward the exterior of the vehicle) sides of the airbag cushion 610. The inboard lateral panel 616 and the outboard lateral panel 614 each includes a non-occupant-facing lobe-forming flap 611c, 611d that couple to the occupant-facing lobe-forming flaps 611a, 611b to form the inboard and outboard lobes 611, respectively. The non-occupant-facing lobe-forming flap 611c, 611d may be positioned to face away from the occupant so as to have little or no contact with an occupant received by the airbag cushion 610 during a collision event.

The internal tethers 613, 623, 624 are incorporated internally to the airbag cushion 610 to help form and deploy the lobes 611. The internal tether 613 includes an occupant-proximal portion 632 that includes a face attachment region 634 that couples to an interior surface of the rear face 618. The face attachment region 634 couples to the rear face 618 so as to be vertically oriented. The internal tether 613 also includes a forward portion 642 that includes a face attachment region 644 that couples to an interior surface of a forward portion of the airbag cushion 610, whether on the main panel 620 or to an anchor point of the airbag housing (not depicted). The internal lateral tether 623 includes an outboard portion with a lateral attachment region 652 that couples to an interior surface of the outboard lateral panel 614. The internal lateral tether 623 also includes an inboard portion with a lateral attachment region 654 that couples to an interior surface of the inboard lateral panel 616. In the present embodiment, the lateral attachment regions 652, 654 couple to the respective lateral panels 616, 614 so as to be vertically oriented. In other embodiments, the internal lateral tether 623 may attach to the lateral panels 614, 616 in a non-vertical manner. The internal diagonal tethers 624 each have an occupant-proximal portion that includes a face attachment region 662 which couples to an interior surface of the rear face 618 at a predetermined distance from and to either side of the coupling of the internal tether 613 (adjacent to the face attachment region 634 of the internal tether 613). The internal diagonal tethers 624 each have a forward portion that includes a lateral attachment region 664 that couples to an interior surface of the respective lateral panel 616 at a predetermined distance rearward of the attachment of the internal lateral tether 623. Each inboard diagonal tether 624 couples to the interior surface of the rear face 618 at a predetermined distance inboard of the point at which the internal vertical tether 613 couples to the rear face 618. The outboard diagonal tether 624 couples to the interior surface of the rear face 618 at a predetermined distance outboard of the point at which the internal vertical tether 613 couples to the rear face 618. In the present embodiment, the internal diagonal tethers 624 couple to the interior surface of the rear face 618 so as to be vertically oriented (and parallel to the coupling of the internal vertical tether 613 to the rear face 618). The internal diagonal tethers 624 couple to the respective lateral panels 614, 616 so as to be vertically oriented. In other embodiments, the internal diagonal tethers 624 may couple to either the rear face 618 or the lateral panels 614, 616, or both, in a non-vertical manner.

Figure 8A:
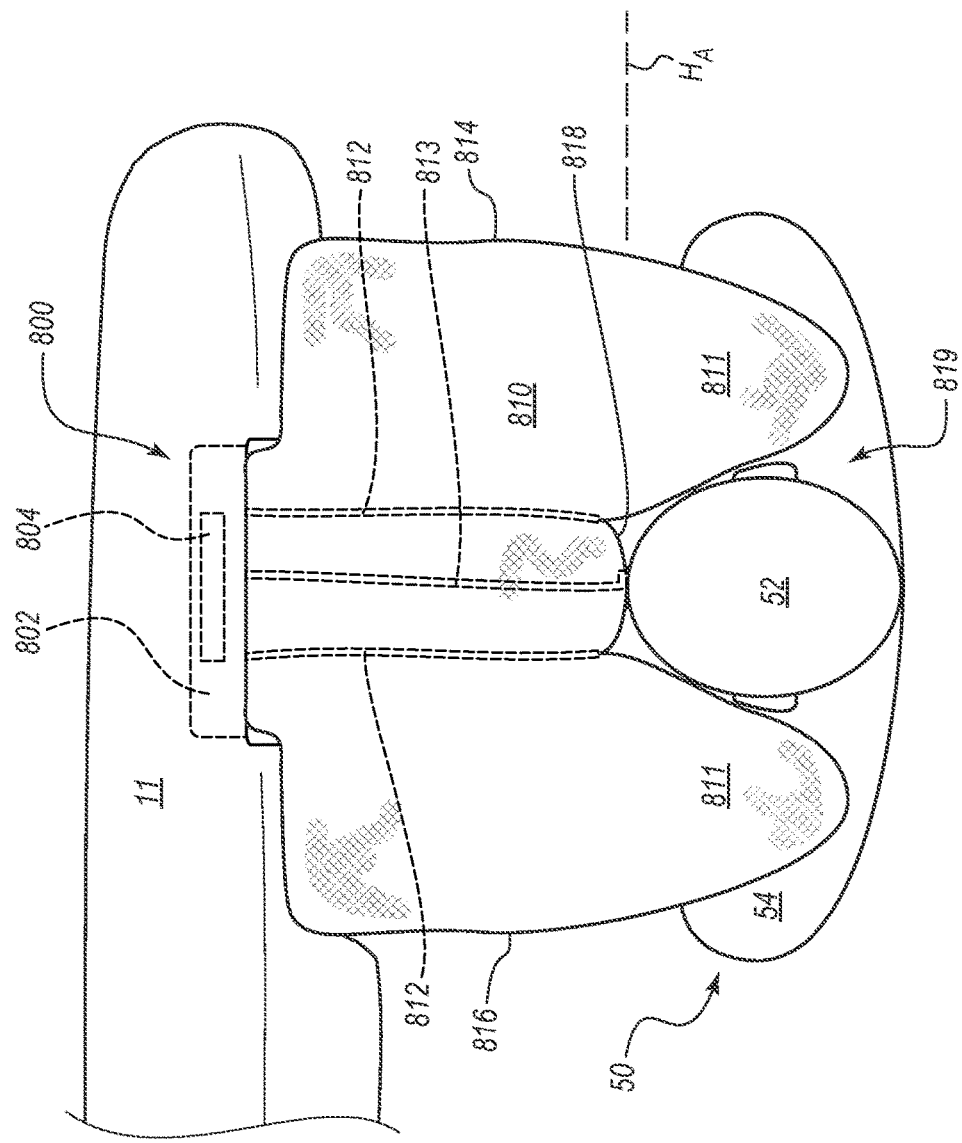
FIG. 8A is a top view of an airbag assembly, according to another embodiment of the present disclosure, that may be similar to the airbag assembly of FIG. 3A and has another alternate configuration of internal tethers.

FIG. 8A is a top view of an airbag assembly 800 similar to the airbag assembly 100 of FIG. 3A and having an alternate configuration of internal tethers 812, 813. An airbag cushion 810 is in a deployed inflated state, and shown immediately prior to contact with the head 52 of the occupant 50. The airbag cushion 810 includes two lobes 811 deployed to either side of the head 52 of the occupant 50 and a rear face 818 deployed directly in front of the head 52 of the occupant 50. The airbag cushion 810 may include an inboard lateral panel 816 disposed toward the interior of the vehicle, and an outboard lateral panel 814 disposed toward the exterior of the vehicle. An occupant-facing surface 819 may be created on the rear face 818 of the airbag cushion 810 from the rear-most part of the lobe 811 on one side, along the surface of that lobe 811 toward and across the surface of the rear face 818 of the airbag cushion 810 and continuing across the surface of and to the rear-most part of the lobe 811 on the opposite side.

Internal to the airbag cushion 810 may be a combination of vertical tethers 812, 813. The internal vertical tethers 812 may be vertical tethers each with a first end coupled at a forward surface of the airbag cushion 810 or airbag assembly 800, and with a second end coupled at a rear interior surface of the airbag cushion 810 at or near the occupant-facing surface 819. In the present embodiment, the forward coupling points for the internal vertical tethers 812 may be located a specific distance to either side of the center of the airbag assembly 800 or airbag cushion 810. In other embodiments, the forward coupling points of the internal vertical tethers 812 may be collocated to each other, which may be at or near the center of the airbag assembly 800 or airbag cushion 810. The internal vertical tethers 812 couple to an internal surface of the occupant-facing surface 819 at or near the juncture of the rear face 818 to the lobes 811 on either side of the airbag cushion 810. As the airbag cushion 810 inflates, the internal vertical tethers 812 draw tight and may help to configure the occupant-facing surface 819 to receive the head 52 of the occupant 50 and the occupant-facing surface of each lobe 811 to assist in receiving the head 52 of the occupant 50.

The internal vertical tether 813 may have a first end coupled at a forward surface of the airbag cushion 810 or airbag assembly 800, and a second end coupled at a rear interior surface of the airbag cushion 810 at or near the center of the occupant-facing surface 819. The internal vertical tethers 812, 813 may be configured to deploy in an approximately parallel manner. The internal vertical tether 813 may cause the rear face 818 to deploy to a specific distance from the airbag assembly 800 mounting point and to position the occupant-facing surface 819 to receive the head 52 of the occupant 50.

The internal vertical tethers 812, 813 may configure the occupant-facing surface 819 with at least one low fabric tension zone in the rear face 818, and with at least one high fabric tension zone in the occupant-facing surface of each of the lobes 811. The low fabric tension zone(s) may limit, reduce, or prevent rotation of the head 52 of the occupant 50 and reduce or eliminate injury to the head 52. The high fabric tension zones in the lobes 811 may prevent the occupant 50 from traveling through the airbag cushion 810 and may assist in controlling, limiting or reducing rotation of the head 52.

Figure 8B:
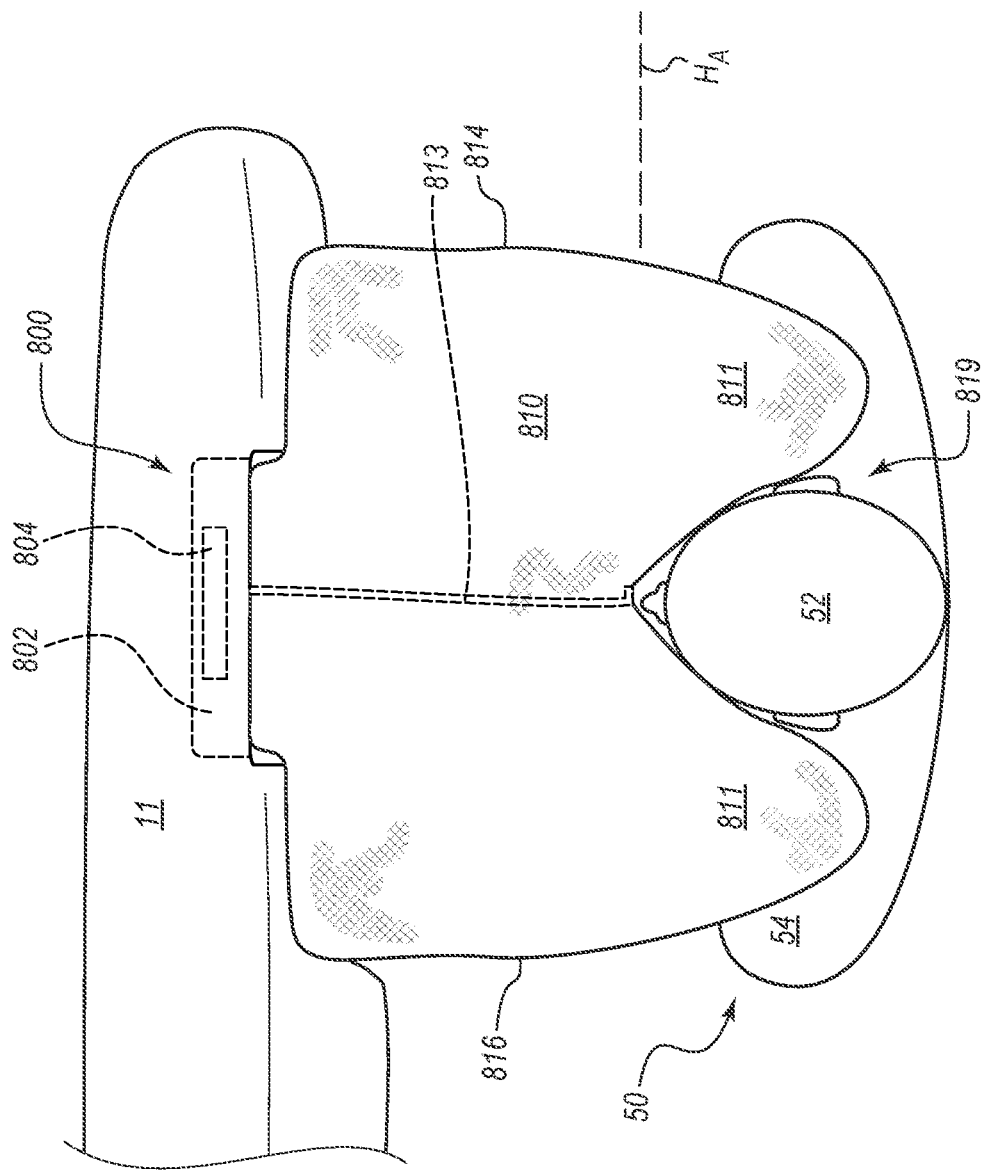
FIG. 8B is a top view of an airbag assembly, according to another embodiment of the present disclosure, that may be similar to the airbag assembly of FIG. 8A and has another alternate configuration of internal tethers.

FIG. 8B is a top view of an airbag assembly 800 similar to the airbag assembly 800 of FIG. 8A and having an alternate configuration of internal tethers, namely a single tether vertical tether 813. An airbag cushion 810 is in a deployed inflated state, at contact by the head 52 of the occupant 50. The airbag cushion 810 includes two lobes 811 deployed to either side of the head 52 of the occupant 50 and an occupant-facing surface 819 deployed directly in front of the head 52 of the occupant 50. The airbag cushion 810 may include an inboard lateral panel 816 disposed toward the interior of the vehicle, and an outboard lateral panel 814 disposed toward the exterior of the vehicle. An occupant-facing surface 819 may be created on the inward-facing surfaces of two lobes 811 from the rear-most part of the lobe 811 on one side, along the surface of that lobe 811 toward and across the surface of and to the rear-most part of the lobe 811 on the opposite side.

The internal vertical tether 813 may have a first end coupled at a forward surface of the airbag cushion 810 or airbag assembly 800, and a second end coupled at a rear interior surface of the airbag cushion 810 at or near the center of the occupant-facing surface 819. The internal vertical tether 813 may cause the center of the occupant-facing surface 819 to deploy to a specific distance from the airbag assembly 800 mounting point and to position the occupant-facing surface 819 to receive the head 52 of the occupant 50. As the airbag cushion 810 deploys and inflates, the internal vertical tether 813 may draw taught and may draw the center portion of the occupant-facing surface 819 forward as the lobes 811 continue to deploy rearward thereby forming an area to receive the head 52 of an occupant 50. The shape of the occupant-facing surface 819 may reduce, limit, or prevent rotation of the head 52 of the occupant 50.

Figure 9A:
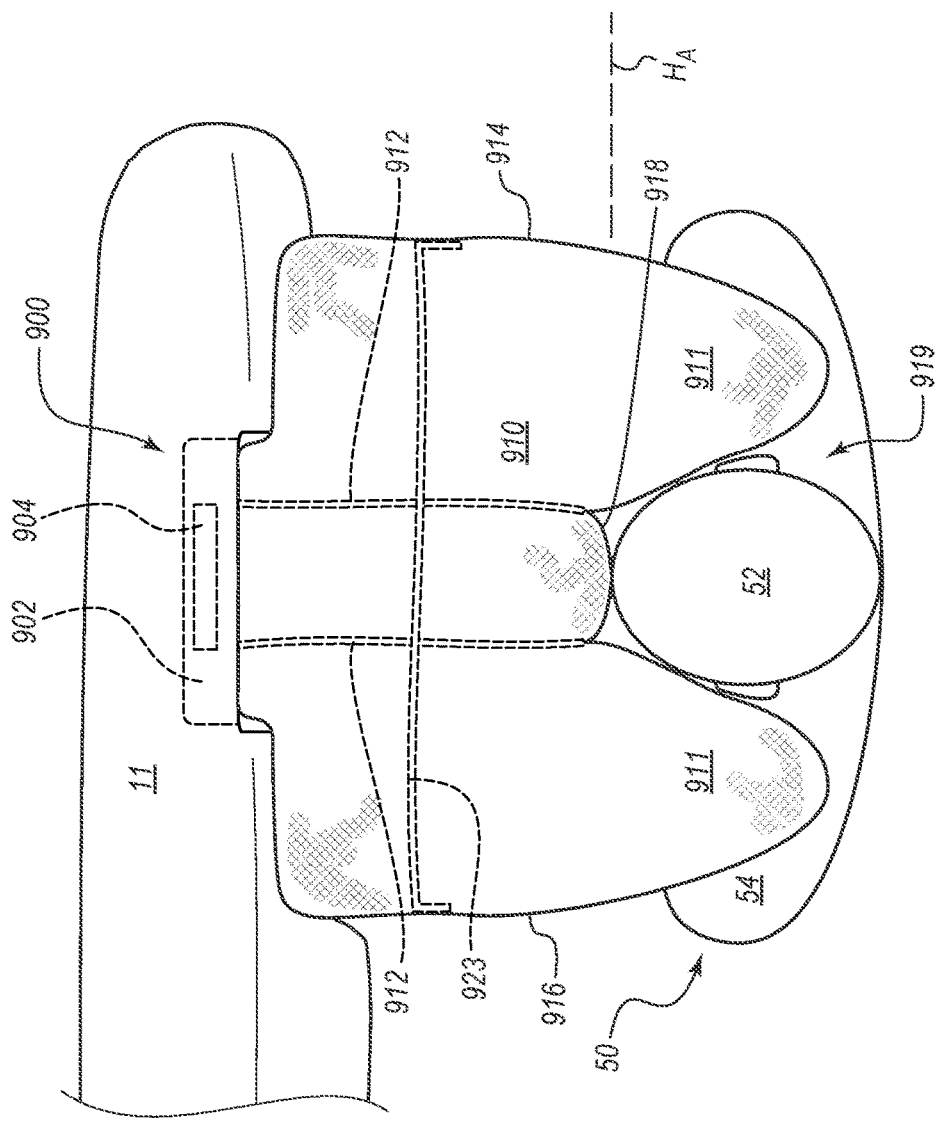
FIG. 9A is a top view of an airbag assembly, according to another embodiment of the present disclosure, that may be similar to the airbag assembly of FIG. 3A and has another alternate configuration of internal tethers.

FIG. 9A is a top view of an airbag assembly 900 similar to the airbag assembly 100 of FIG. 3A and having an alternate configuration of internal tethers 912, 923. An airbag cushion 910 is in a deployed inflated state, and shown immediately prior to contact with the head 52 of the occupant 50. The airbag cushion 910 includes two lobes 911 deployed to either side of the head 52 of the occupant 50 and a rear face 918 deployed directly in front of the head 52 of the occupant 50. The airbag cushion 910 may include an inboard lateral panel 916 disposed toward the interior of the vehicle, and an outboard lateral panel 914 disposed toward the exterior of the vehicle. An occupant-facing surface 919 may be created on the rear-facing portion of the airbag cushion 910 from the rear-most part of the lobe 911 on one side, along the surface of that lobe 911 toward and across the surface of the rear face 918 of the airbag cushion 910 and continuing across the surface of and to the rear-most part of the lobe 911 on the opposite side.

Internal to the airbag cushion 910 may be a combination of tethers 912, 923. The internal vertical tethers 912 may be vertical tethers each with a first end coupled at a forward surface of the airbag cushion 910 or airbag assembly 900, and a second end coupled at a rear interior surface of the airbag cushion 910 at or near the occupant-facing surface 919. In the present embodiment, the forward coupling points for the internal vertical tethers 912 may be located a specific distance to either side of the center of the airbag assembly 900 or airbag cushion 910. In other embodiments, the forward coupling points of the internal vertical tethers 912 may be collocated to each other, which may be at or near the center of the airbag assembly 900 or airbag cushion 910. The internal vertical tethers 912 couple to an internal surface of the rear face 918 at or near the juncture of the rear face 918 to the lobes 911 on either side of the airbag cushion 910. In the embodiment shown, the internal vertical tethers 912 may deploy parallel to each other and couple to the rear surface 918 vertically. As the airbag cushion 910 inflates, the internal vertical tethers 912 draw tight and may help to configure the occupant-facing surface 919 to receive the head 52 of the occupant 50 and the occupant-facing surface of each lobe 911 to assist in receiving the head 52 of the occupant 50. The internal vertical tethers 912 may help to configure a low fabric tension zone in the occupant-facing surface 919, specifically in the rear face 918 of the airbag cushion 910. The low fabric tension zone may limit, reduce, or prevent rotation of the head 52 of the occupant 50 and reduce or prevent injury to the head 52. The internal vertical tethers 912 may also help configure at least one high fabric tension zone in that part of the occupant-facing surface 919 that is on each of the lobes 911. The high fabric tension zone(s) on the lobes 911 may assist in receiving the head 52 of the occupant on the low fabric tension zone of the rear face 918 of the occupant-facing surface 919 and may prevent the occupant 50 from traveling through the lobes 911.

The internal tether 923 may be a lateral tether having a first end coupled at an internal surface of the inboard lateral panel 916, and with a second end coupled at an internal surface of the outboard lateral panel 914. In the embodiment shown, the internal lateral tether 923 couples to the inboard and outboard lateral panels 916, 914 vertically. In other embodiments, the internal lateral tether 923 may couple to the inboard and outboard lateral panels 916, 914 in a non-vertical fashion. As the airbag cushion 910 deploys and inflates, the inboard lateral tether 923 may limit the lateral expansion of the airbag cushion 910 and assist in forming and deploying the lobes 911 to either side of the head 52 of the occupant 50. The inboard lateral tether 923 may also assist in forming one or more high fabric tension zones in the surface of the lobes 911 to prevent the occupant 50 from traveling through the lobes 911.

Figure 9B:
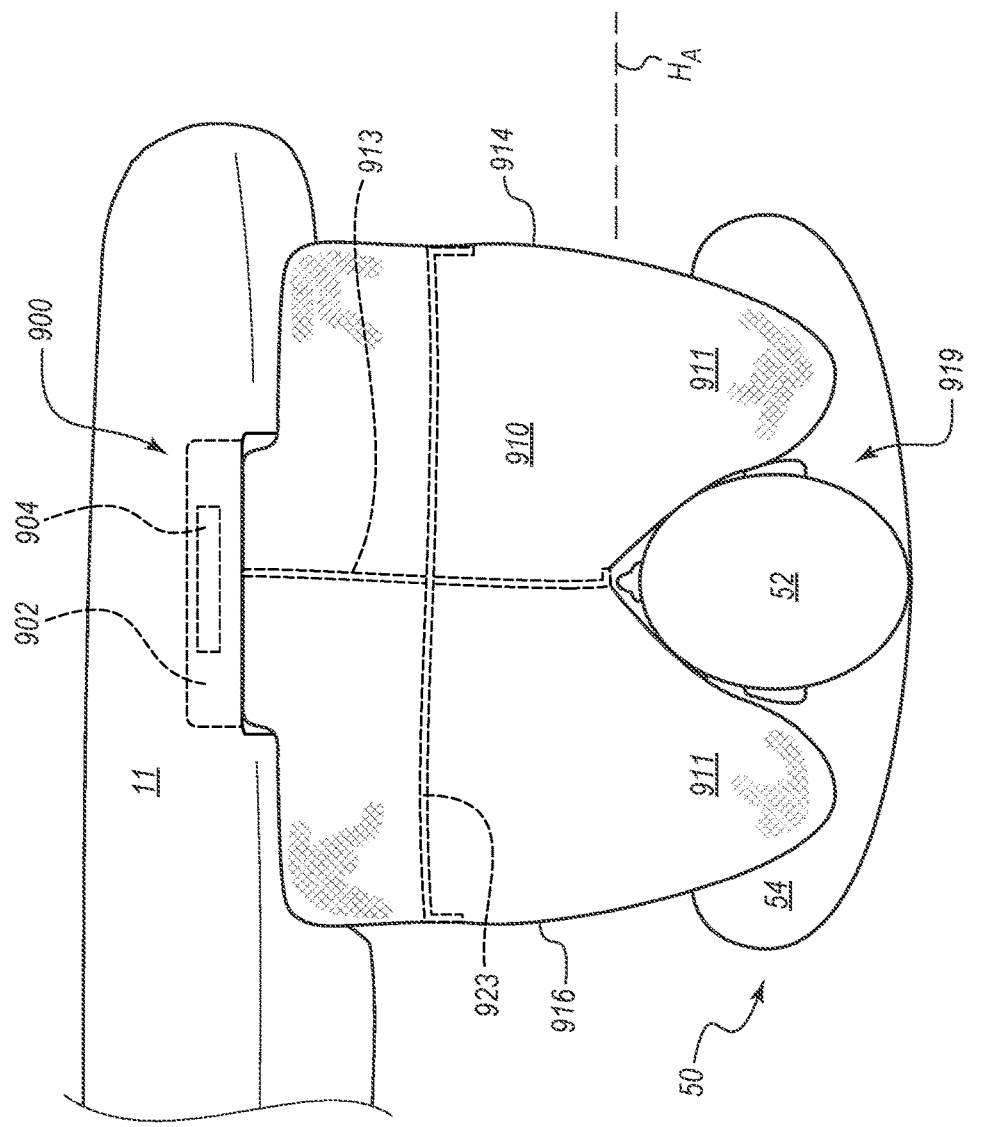
FIG. 9B is a top view of an airbag assembly, according to another embodiment of the present disclosure, that may be similar to the airbag assembly of FIG. 9A and has another alternate configuration of internal tethers.

FIG. 9B is a top view of an airbag assembly 900 similar to the airbag assembly 900 of FIG. 9A and having an alternate configuration of internal tethers 913, 923. An airbag cushion 910 is in a deployed inflated state, and shown at contact with the head 52 of the occupant 50. The airbag cushion 910 includes two lobes 911 deployed to either side of the head 52 of the occupant 50 and an occupant-facing surface 919 deployed directly in front of the head 52 of the occupant 50. The airbag cushion 910 may include an inboard lateral panel 916 disposed toward the interior of the vehicle, and an outboard lateral panel 914 disposed toward the exterior of the vehicle. An occupant-facing surface 919 may be created on the rear-facing portion of the airbag cushion 910 from the rear-most part of the lobe 911 on one side, along the surface of that lobe 911 toward and across the surface of and to the rear-most part of the lobe 911 on the opposite side.

Internal to the airbag cushion 910 may be a combination of tethers 913, 923. An internal vertical tether 913 may be a vertical tether with a first end coupled at a forward surface of the airbag cushion 910 or airbag assembly 900, and a second end coupled at a rear interior surface of the airbag cushion 910 at or near the center of the occupant-facing surface 919. The internal vertical tether 913 couples to an internal surface of the airbag cushion 910 at or near the center of the airbag cushion 910. As the airbag cushion 910 inflates, the internal vertical tether 913 draws tight and may help to configure the occupant-facing surface 919 to receive the head 52 of the occupant 50 and the occupant-facing surface of each lobe 911 to assist in receiving the head 52 of the occupant 50. The internal vertical tether 913 may help to configure a low fabric tension zone in the occupant-facing surface 919. The low fabric tension zone may limit, reduce, or prevent rotation of the head 52 of the occupant 50 and reduce or prevent injury to the head 52. The internal vertical tether 913 may also help configure at least one high fabric tension zone in that part of the occupant-facing surface 919 that is on each of the lobes 911. The high fabric tension zone(s) on the lobes 911 may assist in receiving the head 52 of the occupant on the occupant-facing surface 919 and may prevent the occupant 50 from traveling through the lobes 911.

A lateral internal tether 923 may have a first end coupled at an internal surface of the inboard lateral panel 916, and with a second end coupled at an internal surface of the outboard lateral panel 914. In the embodiment shown, the internal lateral tether 923 couples to the inboard and outboard lateral panels 916, 914 vertically. In other embodiments, the internal lateral tether 923 may couple to the inboard and outboard lateral panels 916, 914 in a non-vertical fashion. As the airbag cushion 910 deploys and inflates, the inboard lateral tether 923 may limit the lateral expansion of the airbag cushion 910 and assist in forming and deploying the lobes 911 to either side of the head 52 of the occupant 50.

Figure 10A:
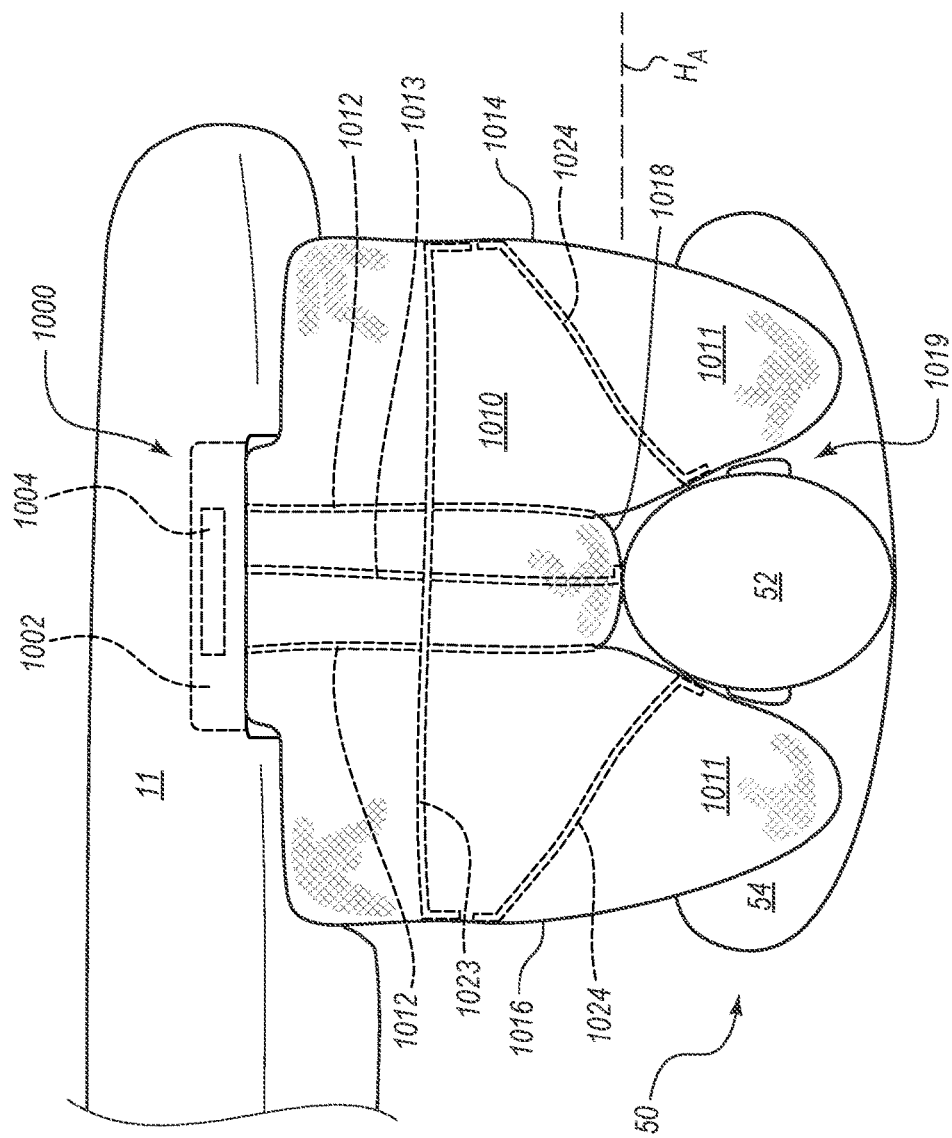
FIG. 10A is a top view of an airbag assembly, according to another embodiment of the present disclosure, that may be similar to the airbag assembly of FIG. 3A and has another alternate configuration of internal tethers.

FIG. 10A is a top view of an airbag assembly 1000 similar to the airbag assembly 100 of FIG. 3A and having an alternate configuration of internal tethers 1012, 1013, 1023, 1024. An airbag cushion 1010 is in a deployed inflated state, and shown immediately prior to contact with the head 52 of the occupant 50. The airbag cushion 1010 includes two lobes 1011 deployed to either side of the head 52 of the occupant 50 and a rear face 1018 disposed directly in front of the head 52 of the occupant 50. The airbag cushion 1010 may include an inboard lateral panel 1016 disposed toward the interior of the vehicle, and an outboard lateral panel 1014 disposed toward the exterior of the vehicle. An occupant-facing surface 1019 may be created on the rear-facing portion of the airbag cushion 1010 from the rear-most part of the lobe 1011 on one side, along the surface of that lobe 1011 toward and across the surface of the rear face 1018 of the airbag cushion 1010 and continuing across the surface of and to the rear-most part of the lobe 1011 on the opposite side.

Internal to the airbag cushion 1010 may be a combination of tethers 1012, 1013, 1023, 1024. The internal tethers 1012 may be vertical tethers each with a first end coupled at a forward surface of the airbag cushion 1010 or airbag assembly 1000, and with a second end coupled at a rear interior surface of the airbag cushion 1010 at or near the occupant-facing surface 1019. In the present embodiment, the forward coupling points for the internal vertical tethers 1012 may be located a specific distance to either side of the center of the airbag assembly 1000 or airbag cushion 1010. In other embodiments, the forward coupling points of the internal vertical tethers 1012 may be collocated to each other, which may be at or near the center of the airbag assembly 1000 or airbag cushion 1010. The internal vertical tethers 1012 couple to an internal surface of the occupant-facing surface

1019 at or near the juncture of the rear face 1018 to the lobes 1011 on either side of the airbag cushion 1010. As the airbag cushion 1010 inflates, the internal vertical tethers 1012 draw tight and may help to configure the occupant-facing surface 1019 to receive the head 52 of the occupant 50 and the occupant-facing surface of each lobe 1011 to assist in receiving the head 52 of the occupant 50.

The internal vertical tether 1013 may have a first end coupled at a forward surface of the airbag cushion 1010 or airbag assembly 1000, and a second end coupled at a rear interior surface of the airbag cushion 1010 at or near the center of the occupant-facing surface 1019. The internal vertical tethers 1012, 1013 may be configured to deploy in an approximately parallel manner. The internal vertical tether 1013 may cause the occupant-facing surface 1019 to deploy to a specific distance from the airbag assembly 1000 mounting point and to position the occupant-facing surface 1019 to receive the head 52 of the occupant 50.

The internal vertical tethers 1012, 1013 may configure the occupant-facing surface 1019 with at least one low fabric tension zone in the rear face 1018, and with at least one high fabric tension zone in the surface of each of the lobes 1011. The low fabric tension zone(s) may limit, reduce, or prevent rotation of the head 52 of an occupant 50 and reduce or eliminate injury to the head 52. The high fabric tension zones in the lobes 1011 may prevent the occupant 50 from traveling through the airbag cushion 1010 and may assist in controlling, limiting or reducing rotation of the head 52.

The internal lateral tether 1023 may be a lateral tether having a first end coupled at an internal surface of the inboard lateral panel 1016, and a second end coupled at an internal surface of the outboard lateral panel 1014. In the embodiment shown, the internal lateral tether 1023 couples to the inboard and outboard lateral panels 1016, 1014 vertically. In other embodiments, the internal lateral tether 1023 may couple to the inboard and outboard lateral panels 1016, 1014 in a non-vertical fashion. As the airbag cushion 1010 deploys and inflates, the internal lateral tether 1023 may limit the lateral expansion of the airbag cushion 1010 and assist in forming and deploying the lobes 1011 to either side of the head 52 of the occupant 50. The internal lateral tether 1023 may also assist in forming one or more high fabric tension zones in the surface of the lobes 1011 to prevent the occupant 50 from traveling through the lobes 1011.

The two internal diagonal tethers 1024 may each be deployed within one lobe 1011. The inboard internal diagonal tether 1024 may be a vertical tether with a first end coupled to an interior surface of the inboard lateral panel 1016, and a second end coupled to an interior surface of the occupant-facing surface 1019 and inboard of the couple point of the internal tether 1012. The outboard internal diagonal tether 1024 may be a vertical tether with a first end coupled to an interior surface of the outboard lateral panel 1014, and a second end coupled to an interior surface of the occupant-facing surface 1019 and outboard of the couple point of the internal tether 1012.

As the airbag cushion 1010 inflates and deploys, the internal tethers 1012, 1013, 1023, 1024 may be drawn tight and may provide support to the airbag cushion 1010 in such a way as to assist in the formation of the two lobes 1011 and the occupant-facing surface 1019. Specifically, the internal vertical tethers 1012, 1013 may assist in positioning the center of the occupant-facing surface 1019 in front of an occupant 50 prior to contact by the head 52 of the occupant 50. The internal lateral tether 1023 may provide support to the inboard and outboard lateral panels 1016, 1014 and may assist in preventing the occupant 50 from traveling through the lobes 1011. The internal diagonal tethers 1024 may provide specific shape to the occupant-facing surface 1019 to form a receiving area for the head 52 of the occupant 50. The internal tethers 1012, 1013, 1024 may configure the occupant-facing surface 1019 of the airbag cushion 1010 so as to form a specific shape to receive the head 52 of the occupant (e.g., see FIG. 6). The combination of the internal tethers 1012, 1013, 1023, 1024 may provide for the formation of at least one low fabric tension zone in the occupant-facing surface 1019. The combination of the internal tethers 1012, 1013, 1023, 1024 may provide for the formation of corresponding high fabric tension zones in the lobes 1011. The high fabric tension zones in the lobes 1011 may prevent the occupant 50 from traveling through the lobes 1011 and striking an internal structure of the vehicle. The low fabric tension zone(s) in the occupant-facing surface 1019 may receive the head 52 of an occupant 50 and reduce or limit rotational speed of the head 52 of an occupant 50, and may thereby reduce the likelihood of injury or reduce the degree of injury to the head 52.

Figure 10B:
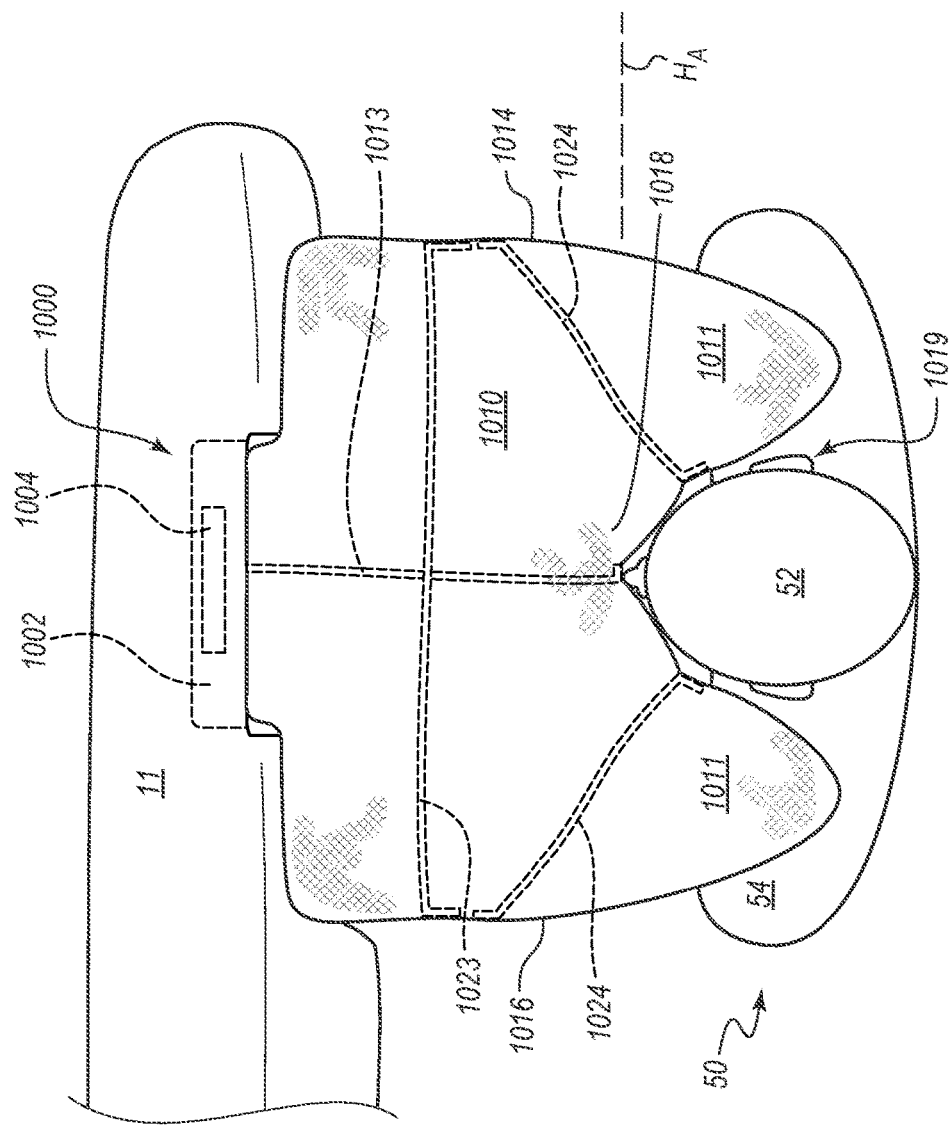
FIG. 10B is a top view of an airbag assembly, according to another embodiment of the present disclosure, that may be similar to the airbag assembly of FIG. 10A and has another alternate configuration of internal tethers.

FIG. 10B is a top view of an airbag assembly 1000 similar to the airbag assembly 1000 of FIG. 10A and having an alternate configuration of internal tethers 1013, 1023, 1024. An airbag cushion 1010 is in a deployed inflated state, and shown immediately prior to contact with the head 52 of the occupant 50. The airbag cushion 1010 includes two lobes 1011 deployed to either side of the head 52 of the occupant 50 and an occupant-facing surface 1019 deployed directly in front of the head 52 of the occupant 50. The airbag cushion 1010 may include an inboard lateral panel 1016 disposed toward the interior of the vehicle, and an outboard lateral panel 1014 disposed toward the exterior of the vehicle. An occupant-facing surface 1019 may be created on the rear-facing portion of the airbag cushion 1010 from the rear-most part of the lobe 1011 on one side, along the surface of that lobe 1011 toward and across the surface of and to the rear-most part of the lobe 1011 on the opposite side.

Internal to the airbag cushion 1010 may be a combination of tethers 1013, 1023, 1024. The internal vertical tether 1013 may have a first end coupled at a forward surface of the airbag cushion 1010 or airbag assembly 1000, and a second end coupled at a rear interior surface of the airbag cushion 1010 at or near the center of the occupant-facing surface 1019. The internal vertical tether 1013 may cause the occupant-facing surface 1019 to deploy to a specific distance from the airbag assembly 1000 mounting point and to position the occupant-facing surface 1019 to receive the head 52 of the occupant 50.

The internal vertical tether 1013 may configure the occupant-facing surface 1019 to limit, reduce, or prevent rotation of the head 52 of an occupant 50 and reduce or eliminate injury to the head 52. The internal lateral tether 1023 may be a lateral tether having a first end coupled at an internal surface of the inboard lateral panel 1016, and a second end coupled at an internal surface of the outboard lateral panel 1014. In the embodiment shown, the internal lateral tether 1023 couples to the inboard and outboard lateral panels 1016, 1014 vertically. In other embodiments, the internal lateral tether 1023 may couple to the inboard and outboard lateral panels 1016, 1014 in a non-vertical fashion. As the airbag cushion 1010 deploys and inflates, the internal lateral tether 1023 may limit the lateral expansion of the airbag cushion 1010 and assist in forming and deploying the lobes 1011 to either side of the head 52 of the occupant 50.

The two internal diagonal tethers 1024 may each be deployed within one lobe 1011. The inboard internal diagonal tether 1024 may be a vertical tether with a first end coupled to an interior surface of the inboard lateral panel 1016, and a second end coupled to an interior surface of the occupant-facing surface 1019 and inboard of the couple point of the internal vertical tether 1013. The outboard internal diagonal tether 1024 may be a vertical tether with a first end coupled to an interior surface of the outboard lateral panel 1014, and a second end coupled to an interior surface of the occupant-facing surface 1019 and outboard of the couple point of the internal vertical tether 1013.

As the airbag cushion 1010 inflates and deploys, the internal tethers 1013, 1023, 1024 may be drawn tight and may provide support to the airbag cushion 1010 in such a way as to assist in the formation of the two lobes 1011 and the occupant-facing surface 1019. Specifically, the internal vertical tether 1013 may assist in positioning the center of the occupant-facing surface 1019 in front of an occupant 50 prior to contact by the head 52 of the occupant 50. The internal lateral tether 1023 may provide support to the inboard and outboard lateral panels 1016, 1014 and may assist in preventing the occupant 50 from traveling through the lobes 1011. The internal diagonal tethers 1024 may provide specific shape to the occupant-facing surface 1019 to form a receiving area for the head 52 of the occupant 50. The internal tethers 1013, 1024 may configure the occupant-facing surface 1019 of the airbag cushion 1010 to receive the head 52 of the occupant to reduce the likelihood of injury or reduce the degree of injury to the head 52.

Figure 11A:
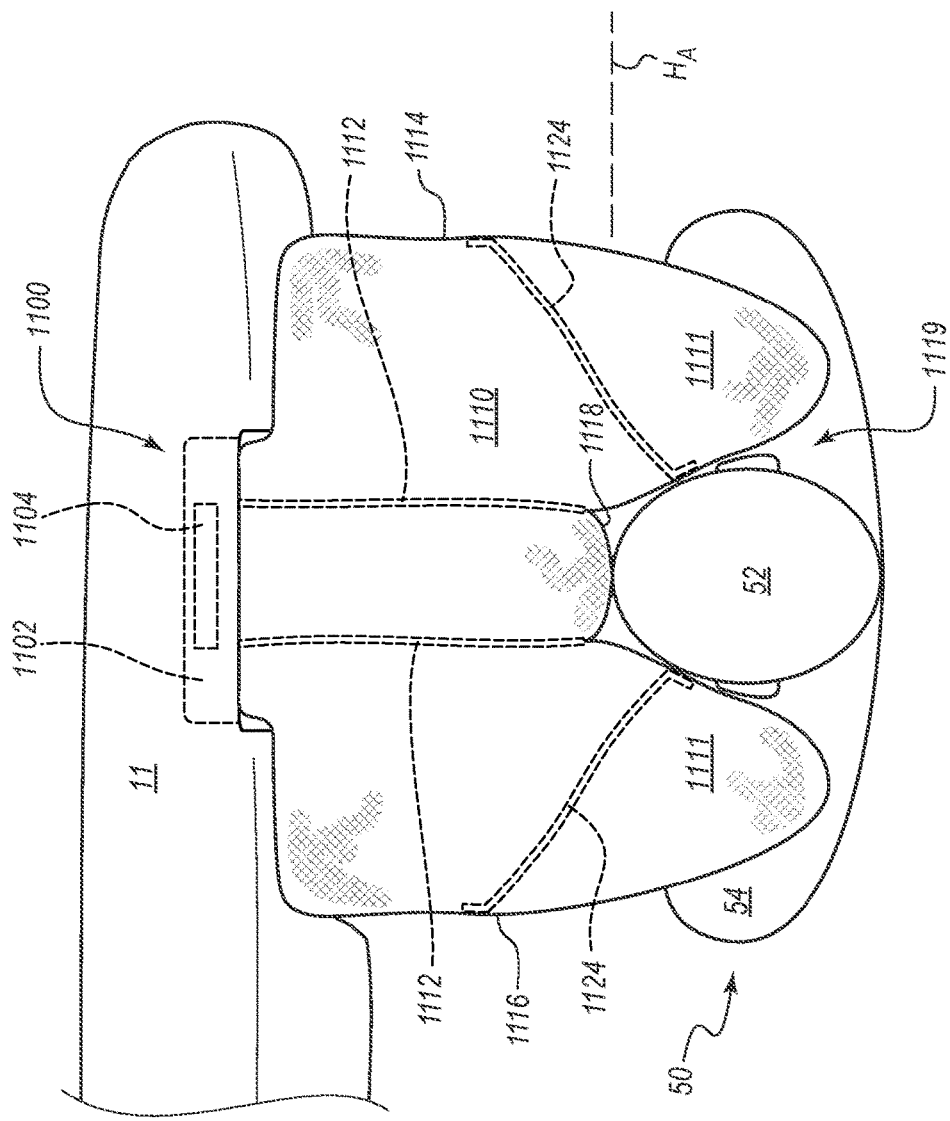
FIG. 11A is a top view of an airbag assembly, according to another embodiment of the present disclosure, that may be similar to the airbag assembly of FIG. 3A and has an alternate configuration of internal tethers.

FIG. 11A is a top view of an airbag assembly 1100 similar to the airbag assembly 100 of FIG. 3A and having an alternate configuration of internal tethers 1112, 1124. An airbag cushion 1110 is in a deployed inflated state, and shown immediately prior to contact with the head 52 of the occupant 50. The airbag cushion 1110 includes two lobes 1111 deployed to either side of the head 52 of the occupant 50 and a rear face 1118 disposed directly in front of the head 52 of the occupant 50. The airbag cushion 1110 may include an inboard lateral panel 1116 disposed toward the interior of the vehicle, and an outboard lateral panel 1114 disposed toward the exterior of the vehicle. An occupant-facing surface 1119 may be created on the rear-facing portion of the airbag cushion 1110 from the rear-most part of the lobe 1111 on one side, along the surface of that lobe 1111 toward and across the surface of the rear face 1118 of the airbag cushion 1110 and continuing across the surface of and to the rear-most part of the lobe 1111 on the opposite side.

Internal to the airbag cushion 1110 may be a combination of the tethers 1112, 1124. The internal tethers 1112 may be vertical tethers each with a first end coupled at a forward surface of the airbag cushion 1110 or airbag assembly 1100, and with a second end coupled at a rear interior surface of the airbag cushion 1110 at or near the occupant-facing surface 1119. In the present embodiment, the forward coupling points for the internal vertical tethers 1112 may be located a specific distance to either side of the center of the airbag assembly 1100 or airbag cushion 1110. In other embodiments, the forward coupling points of the internal vertical tethers 1112 may be collocated to each other, which may be at or near the center of the airbag assembly 1100 or airbag cushion 1110. The internal vertical tethers 1112 couple to an internal surface of the occupant-facing surface 1119 at or near the juncture of the rear face 1118 to the lobes 1111 on either side of the airbag cushion 1110. As the airbag cushion 1110 inflates, the internal vertical tethers 1112 draw tight and may help to configure the occupant-facing surface 1119 to receive the head 52 of the occupant 50 and the occupant-facing surface of each lobe 1111 to assist in receiving the head 52 of the occupant 50.

The two internal diagonal tethers 1124 may each be deployed within one lobe 1111. The inboard internal diagonal tether 1124 may be a vertical tether with a first end coupled to an interior surface of the inboard lateral panel 1116, and a second end coupled to an interior surface of the occupant-facing surface 1119 and inboard of the couple point of the internal vertical tether 1112. The outboard internal diagonal tether 1124 may be a vertical tether with a first end coupled to an interior surface of the outboard lateral panel 1114, and a second end coupled to an interior surface of the occupant-facing surface 1119 and outboard of the couple point of the internal vertical tether 1112.

As the airbag cushion 1110 inflates and deploys, the internal tethers 1112, 1124 may be drawn tight and may provide support to the airbag cushion 1110 in such a way as to assist in the formation of the two lobes 1111 and the occupant-facing surface 1119. Specifically, the internal vertical tethers 1112 may assist in positioning the center of the occupant-facing surface 1119 in front of an occupant 50 prior to contact by the head 52 of the occupant 50. The internal diagonal tethers 1124 may provide specific shape to the occupant-facing surface 1119 to form a receiving area for the head 52 of the occupant 50. The internal tethers 1112, 1124 may configure the occupant-facing surface 1119 of the airbag cushion 1110 so as to form a specific shape to receive the head 52 of the occupant (e.g., see FIG. 6). The combination of the internal tethers 1112, 1124 may provide for the formation of at least one low fabric tension zone in the occupant-facing surface 1119. The combination of the internal tethers 1112, 1124 may provide for the formation of corresponding high fabric tension zones in the lobes 1111. The high fabric tension zones in the lobes 1111 may prevent the occupant 50 from traveling through the lobes 1111 and striking an internal structure of the vehicle. The low fabric tension zone(s) in the occupant-facing surface 1119 may receive the head 52 of an occupant 50 and reduce or limit rotational speed of the head 52 of an occupant 50, and may thereby reduce the likelihood of injury or reduce the degree of injury to the head 52.

Figure 11B:
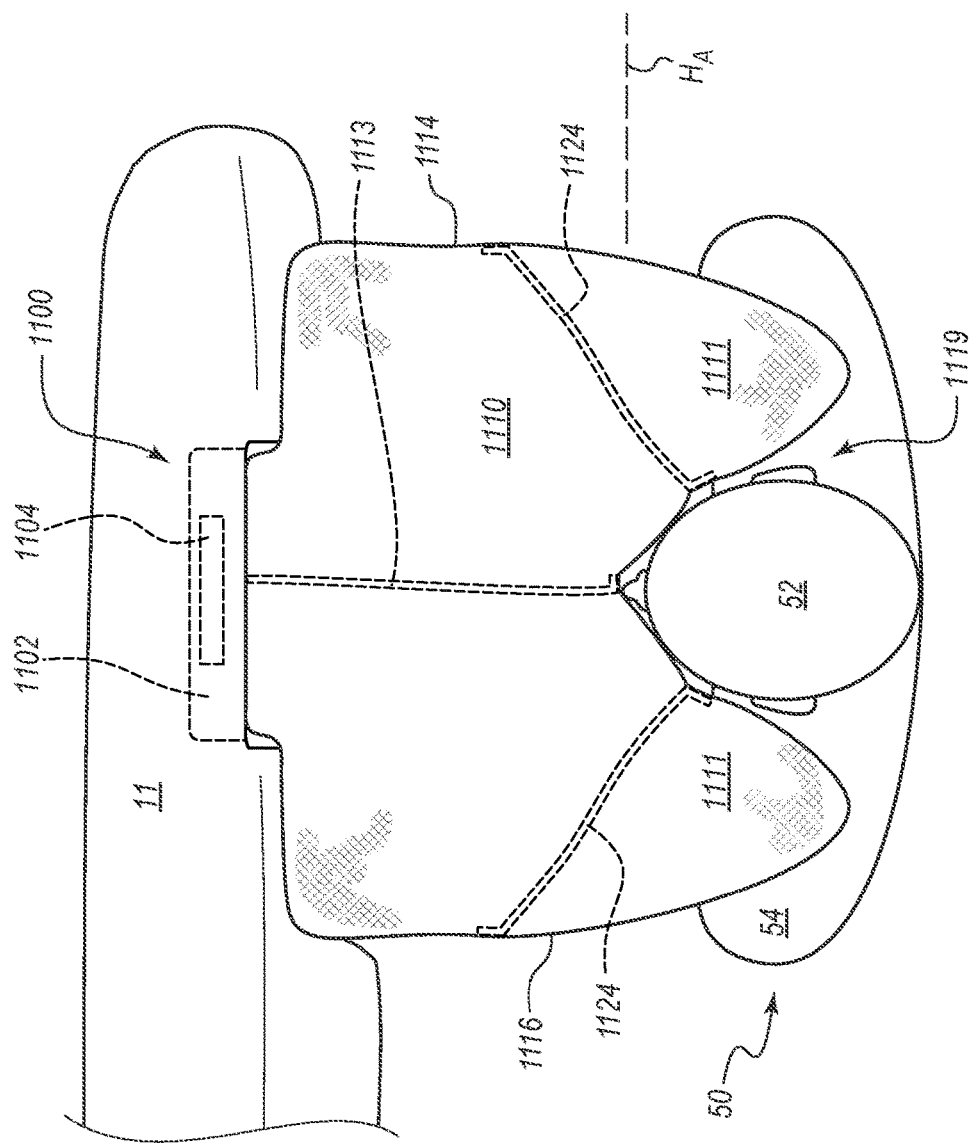
FIG. 11B is a top view of an airbag assembly, according to another embodiment of the present disclosure, that may be similar to the airbag assembly of FIG. 11A and has an alternate configuration of internal tethers.

FIG. 11B is a top view of an airbag assembly 1100 similar to the airbag assembly 1100 of FIG. 11A and having an alternate configuration of internal tethers 1113, 1124. An airbag cushion 1110 is in a deployed inflated state, and shown at contact by the head 52 of the occupant 50. The airbag cushion 1110 includes two lobes 1111 deployed to either side of the head 52 of the occupant 50 and an occupant-facing surface 1119 disposed directly in front of the head 52 of the occupant 50. The airbag cushion 1110 may include an inboard lateral panel 1116 disposed toward the interior of the vehicle, and an outboard lateral panel 1114 disposed toward the exterior of the vehicle. An occupant-facing surface 1119 may be created on the rear-facing portion of the airbag cushion 1110 from the rear-most part of the lobe 1111 on one side, along the surface of that lobe 1111 toward and across the surface of and to the rear-most part of the lobe 1111 on the opposite side.

Internal to the airbag cushion 1110 may be a combination of the tethers 1113, 1124. The internal tether 1113 may be a vertical tether with a first end coupled at a forward surface of the airbag cushion 1110 or airbag assembly 1100, and with a second end coupled at a rear interior surface of the airbag cushion 1110 at or near center of the occupant-facing surface 1119. As the airbag cushion 1110 inflates, the internal vertical tether 1113 draws tight and may help to configure the occupant-facing surface 1119 to receive the head 52 of the occupant 50 and the occupant-facing surface of each lobe 1111 to assist in receiving the head 52 of the occupant 50.

The two internal diagonal tethers 1124 may each be deployed within one lobe 1111. The inboard internal diagonal tether 1124 may be a vertical tether with a first end coupled to an interior surface of the inboard lateral panel 1116, and a second end coupled to an interior surface of the occupant-facing surface 1119 and inboard of the couple point of the internal vertical tether 1113. The outboard internal diagonal tether 1124 may be a vertical tether with a first end coupled to an interior surface of the outboard lateral panel 1114, and a second end coupled to an interior surface of the occupant-facing surface 1119 and outboard of the couple point of the internal vertical tether 1113.

As the airbag cushion 1110 inflates and deploys, the internal tethers 1113, 1124 may be drawn tight and may provide support to the airbag cushion 1110 in such a way as to assist in the formation of the two lobes 1111 and the occupant-facing surface 1119. Specifically, the internal vertical tether 1113 may assist in positioning the center of the occupant-facing surface 1119 in front of an occupant 50 prior to contact by the head 52 of the occupant 50. The internal diagonal tethers 1124 may provide specific shape to the occupant-facing surface 1119 to form a receiving area for the head 52 of the occupant 50. The internal tethers 1113, 1124 may configure the occupant-facing surface 1119 of the airbag cushion 1110 so as to form a specific shape to receive the head 52 of the occupant and reduce or limit rotational speed of the head 52 of an occupant 50, and may thereby reduce the likelihood of injury or reduce the degree of injury to the head 52.

Figure 12B:
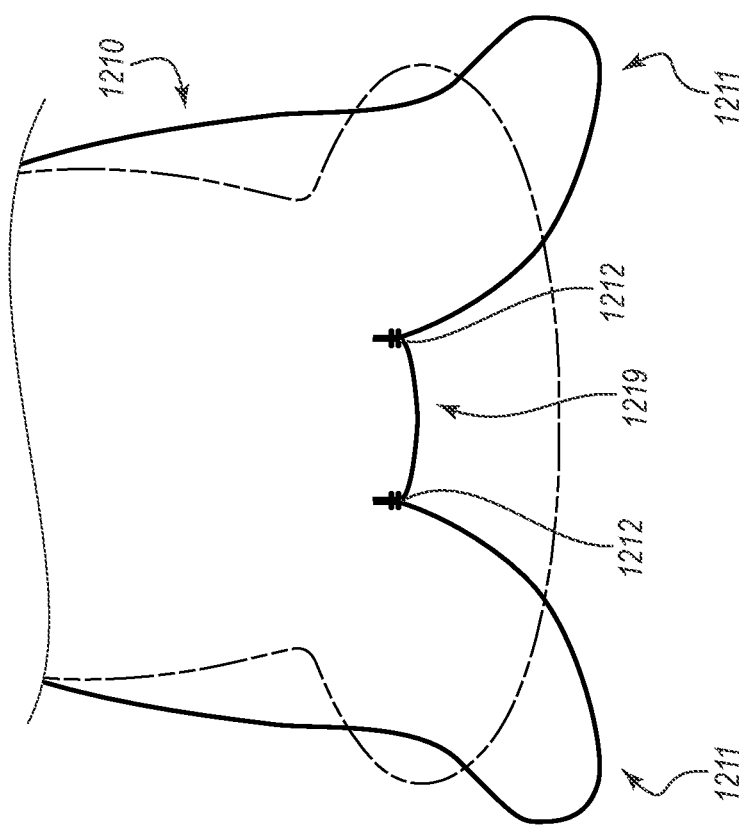
FIG. 12B is a top profile comparison diagram roughly illustrating a distinction between an airbag cushion without a zero-length tether and the airbag cushion of FIG. 12A.
Figure 12A:
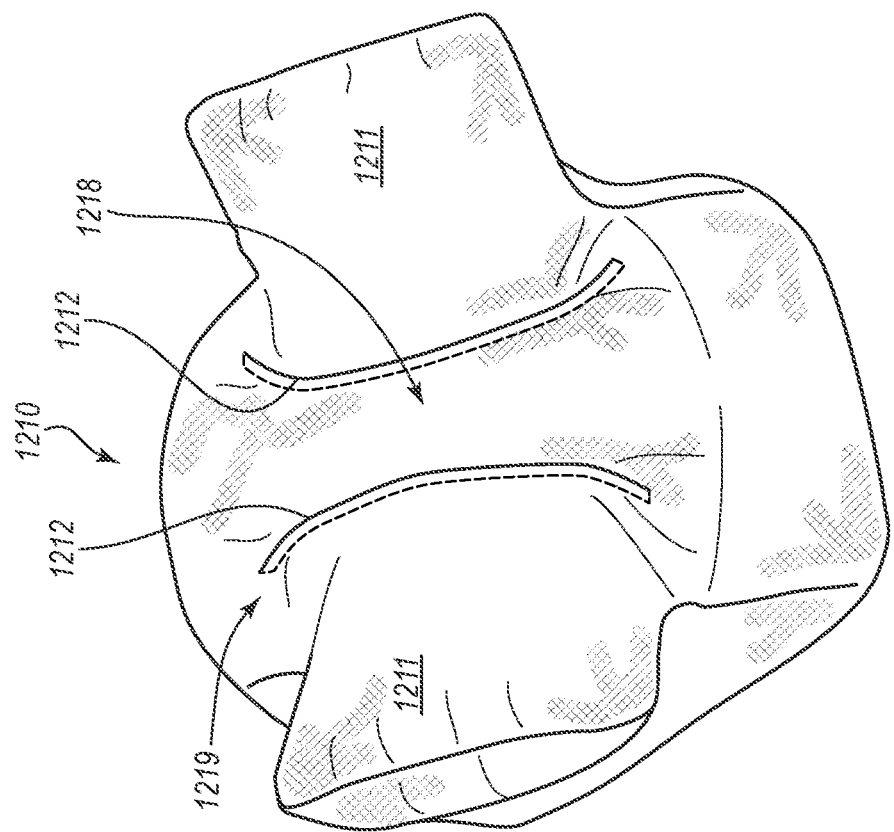
FIG. 12A is a perspective view of an airbag cushion, according to one embodiment of the present disclosure, including lobes formed by zero-length tethers.

FIG. 12A is a perspective view of an airbag cushion 1210 employing lobes 1211 formed by zero-length tethers 1212. The airbag cushion 1210 may include an occupant-facing surface 1219, and two lobes 1211 disposed to either side of a central rear-facing surface 1218 (which is part of the occupant-facing surface 1219). The occupant-facing surface 1219 includes a surface of the airbag cushion 1210 beginning at the rear-most part of one lobe 1211 and extending across the surface of that lobe 1211 to and across the surface of the rear-facing surface 1218 and continuing across the surface of, and to the rear-most part of the opposite lobe 1211. Each zero-length tether 1212 may be formed by a vertical seam located at or near the juncture between the respective lobe 1211 and the central rear-facing surface 1218. In some embodiments, the airbag cushion 1210 may be formed by a single-piece construction method. In other embodiments, the airbag cushion 1210 may be formed by joining together multiple panels. In an embodiment involving single-piece construction, the zero-length tethers 1212 may be formed by removing or folding a portion of panel and creating a vertical seam that draws the lobes 1211 rearward such that the lobes 1211 may extend rearward over the shoulders of an occupant (not depicted) and form a receiving area for the head of an occupant (not depicted). In an embodiment involving multiple panel assembly, each zero-length tether 1212 may be formed by a vertical seam along a pre-cut edge of the panels forming the respective lobe 1211 and the central rear-facing surface 1218. The vertical seams forming the zero-length tethers 1212 may be formed by sewing, tape, gluing, RF welding, ultrasonic welding, or any other suitable method. The zero-length tethers 1212 may configure the occupant-facing surface 1219 to be disposed directly in front of an occupant's head (not depicted). Configuring the occupant-facing surface 1219 in front of an occupant's head may create a receiving area on the rear surface of the airbag cushion 1210 for the occupant's head. The zero-length tethers 1212 may also draw the lobes 1211 rearward to position the lobes 1211 over the shoulders of an occupant (not depicted). The combination of configuring the receiving area in the occupant-facing surface 1219 and configuring the lobes 1211 rearward may limit, reduce, or prevent rotation of the occupant's head (not depicted) in a collision and may reduce or prevent injury to the occupant's head.

FIG. 12B is an overhead profile comparison diagram roughly illustrating the distinction between an airbag cushion without a zero-tether embodiment and an airbag cushion 1210 employing at least one embodiment of the zero-length tethers 1212 of FIG. 12A. The zero-length tethers 1212 may draw the lobes 1211 rearward and somewhat toward each other and may help to configure the occupant-facing surface 1219 to receive the head of an occupant.

Figure 13B:
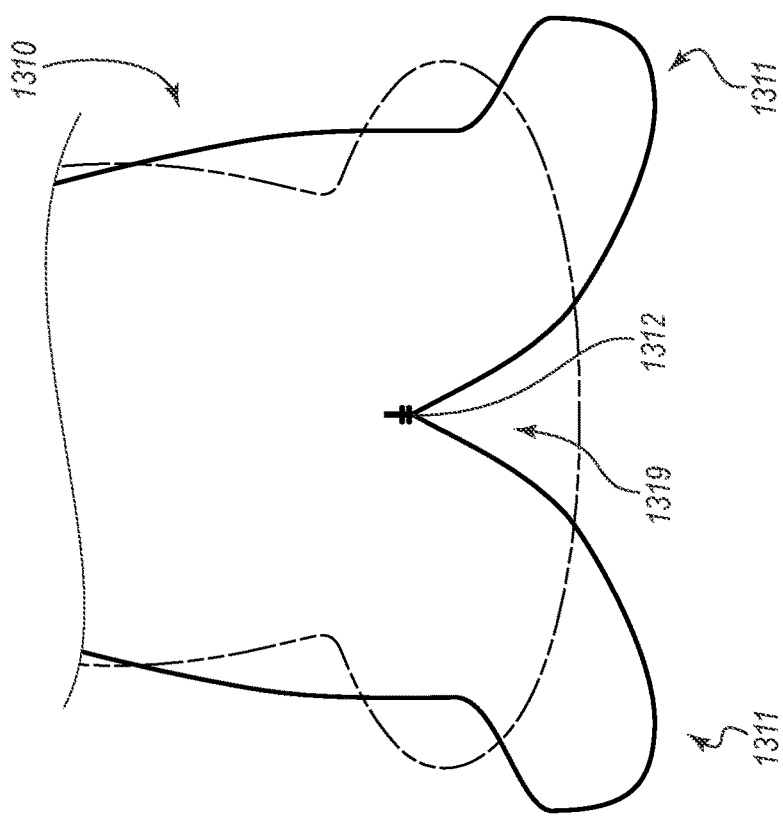
FIG. 13B is a top profile comparison diagram roughly illustrating a distinction between an airbag cushion without a zero-length tether and the airbag cushion of FIG. 13A.
Figure 13A:
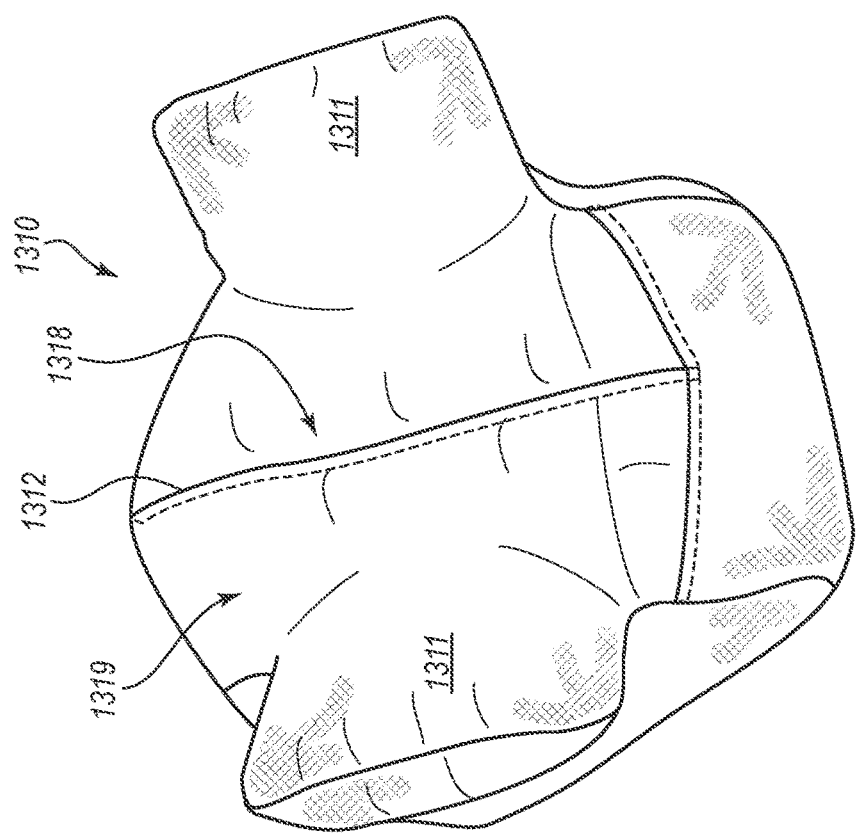
FIG. 13A is a perspective view of an airbag cushion, according to another embodiment of the present disclosure, including lobes formed by a single zero-length tether.

FIG. 13A is a perspective view of an airbag cushion 1310 including lobes 1311 formed by a zero-length tether 1312. The airbag cushion 1310 may include an occupant-facing surface 1319 and two lobes 1311 disposed to either side of the zero-length tether 1312. The occupant-facing surface 1319 includes one or more rear surfaces of the airbag cushion 1310 beginning at a rear-most point of one lobe 1311 and extending across that lobe 1311 to the zero-length tether 1312 and continuing to a rear-most point of the opposite lobe 1311. The zero-length tether 1312 may be formed as or by a vertical seam located at or near a center of the occupant-facing surface 1319 of the airbag cushion 1310. In some embodiments, the airbag cushion 1310 may be formed by a single-piece construction method. In other embodiments, the airbag cushion 1310 may be formed by joining together multiple panels. In an embodiment involving single-piece construction, the zero-length tether 1312 may be formed by removing or folding a portion of panel and creating a vertical seam. The zero-length tether 1312 draws the lobes 1311 rearward, such that the lobes 1311 may extend rearward. For example, the zero-length tether 1312 may draw rearward or otherwise configure the lobes 1311 to extend rearward over the shoulders of an occupant and form a receiving area for the head of an occupant. In an embodiment involving multiple panel assembly, the zero-length tether 1312 may be formed by a vertical seam within a given panel that provides a rear surface, or occupant-facing surface 1319 of the airbag cushion 1310, or along a pre-cut edge of the panels forming the lobes 1311. The vertical seam forming the zero-length tether 1312 may be formed by sewing, tape, gluing, RF welding, ultrasonic welding, or any other suitable method. The zero-length tether 1312 may configure the occupant-facing surface 1319 to be disposed directly in front of an occupant's head. Configuring the occupant-facing surface 1319 in front of an occupant's head may create a receiving area 1318 on the rear surface of the airbag cushion 1310 for the occupant's head. The combination of configuring the receiving area in the occupant-facing surface 1319 and drawing the lobes 1311 rearward may limit, reduce, or prevent rotation of the occupant's head in a collision and may reduce or prevent injury to the occupant's head.

FIG. 13B is an overhead profile comparison diagram that roughly illustrates distinctions between an airbag cushion without a zero-tether embodiment and an airbag cushion 1310 employing at least one embodiment of the zero-length tether 1312 of FIG. 13A. The zero-length tether 1312 may draw the lobes 1311 rearward and somewhat toward each other and may help to configure the occupant-facing surface 1319 to receive the head of an occupant.

FIG. 14A is a perspective view of an airbag cushion 1410 including a main airbag chamber 1409 and a "bow-tie" pillow cushion 1413. The "bow-tie" pillow cushion 1413 may be a secondary inflatable chamber disposed on and coupled to an occupant-facing surface 1419 and in fluid communication through the occupant-facing surface 1419 with the inflatable chamber of the airbag cushion 1410. The airbag cushion 1410 has been deployed and inflated by operation of an airbag inflator (not depicted). The airbag cushion 1410 may include a main chamber 1409 and the "bow-tie" pillow cushion 1413. The airbag cushion 1410 includes a pair of lobes that together comprise a "bow-tie" lobe chamber.

The main airbag chamber 1409 of the airbag cushion 1410 may be formed by a single-piece construction method, or by assembling together multiple panels. Similarly, the "bow-tie" pillow cushion 1413 may be formed from a single panel, or by assembling together multiple panels. In the embodiment shown, the main airbag chamber 1409 may include a main panel 1420, an inboard lateral panel 1416 disposed toward the interior of the vehicle, and an outboard lateral panel 1414 disposed toward the exterior of the vehicle. The "bow-tie" pillow cushion 1413 may include zero-length tethers 1412. The zero-length tethers 1412 may each be formed as a seam that may be created by sewing, gluing, taping, RF welding, ultrasonic welding, or any suitable method. The "bow-tie" pillow cushion 1413 may include an occupant-facing surface 1419. The occupant-facing surface 1419 may include a rear-facing portion of the "bow-tie" pillow cushion 1413 beginning at or near a seam 1423 on a lobe 1411 and running across a rear surface of that lobe 1411 to and across the central rear face 1418 and then across a rear surface of the opposite lobe 1411 to or near the seam 1423 on the opposite lobe 1411.

The zero-length tethers 1412 may be vertical pinch seams on the rear-facing surface 1418 of the "bow-tie" pillow cushion 1413 so as to form a receiving area for the head of an occupant (not depicted). The zero-length tethers 1412 may also help to draw the lobes 1411 somewhat rearward. The zero-length tethers 1412 (e.g., pinch seams) essentially make the front panel become shorter than the back panel so the lobes 1411 rotate vehicle-rearward at angles. The angle of the lobes 1411 can be controlled by how much of the front panel is pinched and the shape of the seam of each zero-length tether 1412. The configuration of the "bow-tie" pillow cushion 1413 by the zero-length tethers 1412 may allow the central rear face 1418 to receive the head of an occupant during a collision and draw the lobes rearward around the head of the occupant so as to reduce, limit, or prevent rotation of the occupant's head. Reducing, limiting, or preventing head rotation of an occupant may reduce or prevent injury to the occupant's head.

The seams 1423 may be vertical seams located near the ends of the lobes 1411. The seams 1423 may help to form the lobes 1411 of the "bow-tie" pillow cushion 1413.

The seams 1424 may be located at or near a junction between the "bow-tie" pillow cushion 1413 and the main airbag chamber 1409. The seams 1424 may be zero-length tethers that at least partially form a rear face of the main airbag chamber 1409, as well as the lobes 1411, and the central rear face 1418 of the "bow-tie" pillow cushion 1413. The "bow-tie" pillow cushion 1413 may be coupled to the main airbag chamber 1409 by or at the seams 1424.

The rear face 1418 of the "bow-tie" pillow cushion 1413 may include at least one flatness control stitch seam 1425 running horizontally or approximately horizontally across the front panel of the "bow tie" pillow cushion 1413. The flatness control stitch seam(s) 1425 may serve to join the forward panel of the "bow tie" pillow cushion 1413 to the rear panel of the main airbag chamber 1409. A position of one or more of the flatness control stitch seams 1425 may limit a tendency of the rear face 1418 of the "bow tie" pillow cushion 1413 to bulge rearward, or "pouch" outward toward an occupant. A rearward bulge of the rear face 1418 may reduce the effectiveness of the "bow-tie" pillow cushion 1413 in reducing, limiting, or preventing rotation of an occupant's head. In the embodiment shown, two flatness control stitch seams 1425 are located on the forward panel of the "bow tie" pillow cushion 1413 at an offset distance $D_O$ from a centerline $CL_A$ of an aperture 1472. The offset distance $D_O$ of the flatness control stitch seams 1425 may affect the degree to which the flatness control stitch seams 1425 reduce or prevent rearward bulging of the rear face 1418. The flatness control stitch seams 1425 may provide or configure a substantially flat portion of the occupant-facing surface 1419 to receive the head of an occupant in a collision and may assist in limiting, reducing or preventing rotation of the head.

Airbag inflation gases may enter the "bow-tie" pillow cushion 1413 through the aperture 1472 in fluid communication with the main airbag chamber 1409. The aperture 1472 may include a valve, a baffle, or any other suitable means for admitting airbag inflator gases to the "bow-tie" pillow cushion 1413.

In at least one embodiment, the means of communicating airbag inflator gases through the aperture 1472 to the "bow-tie" pillow cushion 1413 may allow unrestricted communication of gases between the main airbag chamber 1409 and the "bow-tie" pillow cushion 1413. In an unrestricted-flow embodiment, the inflation pressures of the main airbag chamber 1409 and "bow-tie" pillow cushion 1413 may be the same or nearly the same and may result in substantial control of the occupant's head during ride down (e.g., the deflation evolution throughout a collision). In another embodiment, the means of communicating airbag inflator gases through the aperture 1472 from the main airbag chamber 1409 to the "bow-tie" pillow cushion 1413 may limit or restrict the passage of gases such that the inflation pressure of the "bow-tie" pillow cushion 1413 is lower than the inflation pressure of the main airbag chamber 1409. In a low-pressure "bow-tie" pillow cushion 1413 embodiment, the "bow-tie" pillow cushion 1413 may have a lower pressure than the main airbag chamber 1409, which may allow the "bow-tie" pillow cushion 1413 to provide added protection to reduce or mitigate rotation of the head of an occupant while the deflation of the main airbag chamber 1409 throughout the collision event manages the deceleration of the occupant's torso. In some embodiments, the means of communicating inflation gases through the aperture 1472 from the main airbag chamber 1409 to the "bow-tie" pillow cushion 1413 may limit the backflow of inflator gases from the "bow-tie" pillow cushion 1413 to the main airbag chamber 1409. In a backflow-limiting embodiment, the limitation of backflow of inflator gases from the "bow-tie" pillow chamber 1413 through the aperture 1472 may allow the "bow-tie" pillow chamber 1413 to maintain contact with the sides and front of on occupant's head longer through the collision evolution so as to more effectively control or limit head rotation.

FIG. 14B is an overhead profile view of an airbag cushion 1410 similar to the airbag cushion 1410 of FIG. 14A. In this embodiment, the seams 1424 may serve to connect the "bow-tie" pillow cushion 1413 to the main airbag chamber 1409. The seams 1423 may be located at an extreme rearward end of each lobe 1411. The zero-length tethers 1412 may be located to either side of the central rear face 1418. The zero-length tethers 1412 may configure the occupant-facing surface 1419 to receive the head of an occupant during a collision event. More specifically, the zero-length tethers 1412 and the seams 1423, 1424 may configure the "bow-tie" pillow cushion 1413 to have at least one low-fabric tension zone on the central rear face 1418, and corresponding high fabric tension zones in the lobes 1411. The combination of low and high fabric tension zones may allow the "bow-tie" pillow cushion 1413 to limit, reduce, or even prevent rotation of the head of an occupant. Upon contact of the head with the central rear face 1418 of the "bow-tie" pillow cushion 1413, the central rear face 1418 may compress forward due to the low fabric tension zone while drawing the lobes 1411 rearward and together around the sides of the head of the occupant. In other words, the lobes 1411 may pivot relative to the central face 1418 to fold or swing inward and engage the head of the occupant. This compression and drawing action of the "bow-tie" pillow cushion 1413 may limit, reduce, or prevent head rotation during a collision event and may reduce HIC/BrIC.

Figure 15:
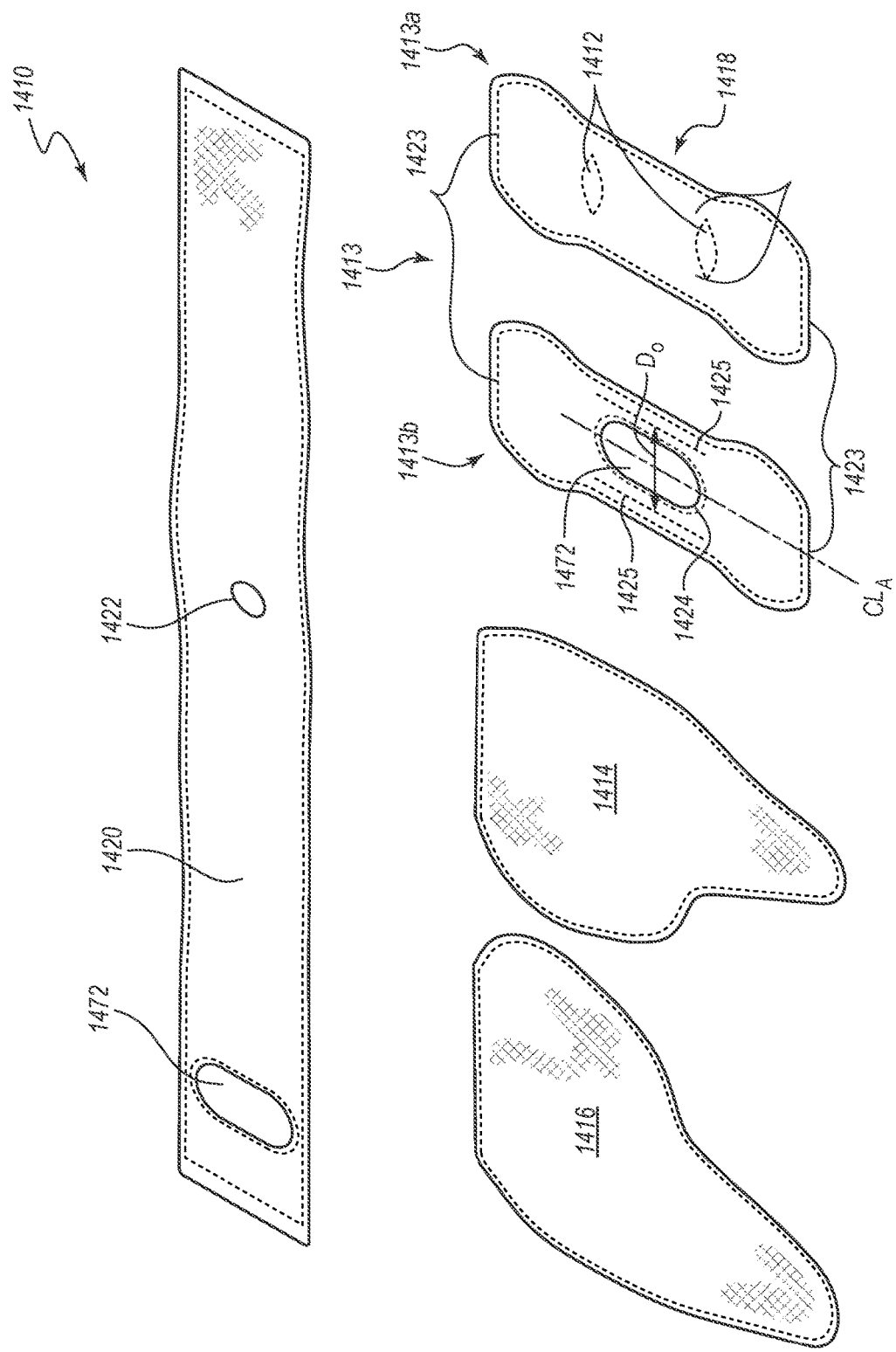
FIG. 15 is a component view of the airbag cushion of FIGS. 14A and 14B.

FIG. 15 is a component view of an airbag cushion 1410 similar to the airbag cushion 1410 of FIGS. 14A, 14B illustrating some of the major components of the airbag cushion 1410. In this embodiment, the airbag cushion 1410 may include a main panel 1420, an inboard lateral panel 1416, an outboard lateral panel 1414, and a "bow-tie" pillow cushion 1413 panel set. The main panel 1420 may include an inflator port 1422 or other provision to facilitate inflation of the airbag cushion 1410. The main panel 1420 may also include an aperture 1472 to communicate inflation gases into the "bow-tie" pillow cushion 1413. In some embodiments, the "bow-tie" pillow cushion 1413 may consist of a single panel. In other embodiments, the 'bow-tie" pillow cushion 1413 may include multiple panels. In the embodiment shown, the "bow-tie" pillow cushion 1413 includes an occupant-facing panel 1413a and a forward panel 1413b. The forward panel 1413b may include an aperture 1472. The aperture 1472 may serve to communicate airbag inflation gases between the main airbag chamber 1409 (see FIG. 14A) and the "bow-tie" pillow cushion 1413 (see FIG. 14A). In the present embodiment, the forward panel 1413b of the "bow-tie" pillow cushion 1413 connects to the main panel 1420 by a seam or series of seams around the aperture 1472. The seams may be formed by sewing, gluing, tape, RF welding, ultrasonic welding, or any other suitable method. The areas immediately around the aperture 1472 in the forward panel 1413b, and around the aperture 1472 in the main panel 1420, may each include a face attachment region to interface the main panel 1420 and the forward panel 1413b. In the embodiment shown, the seams 1424 are co-existent with lateral portions of the seam(s) connecting the forward panel 1413b to the main panel 1420. The occupant-facing panel 1413a and the forward panel 1413b may be connected to each other by seams. In the embodiment shown the seams 1423 are contiguous with the lateral portions of the seams which join the occupant-facing panel 1413a and the forward panel 1413b. More specifically, the occupant-facing panel 1413a and the forward panel 1413b each may have a face attachment region which incorporates at least the area of the zero-length tethers or seams 1423. The zero-length tethers 1412 may be located in the occupant-facing panel 1413a. The zero-length tethers 1412 may each be formed by a cut-and-sew method, or any other suitable method whereby a seam is formed drawing together the fabric to form a pinch in the fabric of the occupant-facing panel 1413a. The occupant-facing panel 1413a may also include at least one flatness control stitch 1425. In the present embodiment, two flatness control stitches 1425 may be located at an offset distance $D_O$ from a projection $CL_P$ onto the occupant-facing panel 1413a of a centerline $CL_A$ through the aperture 1472 in the forward panel 1413b. The flatness control stitches 1425 run horizontally or approximately horizontally across the rear face 1418 of the occupant-facing panel 1413a.

Figure 16:
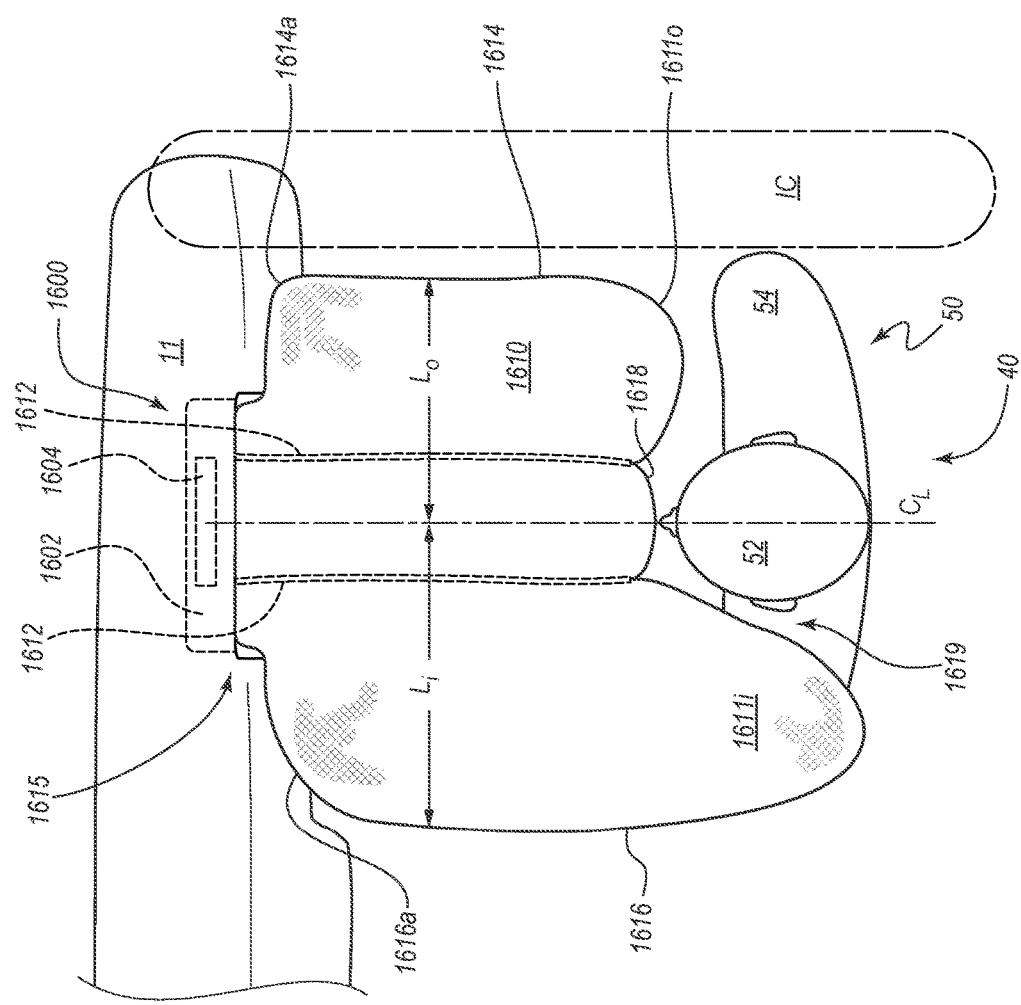
FIG. 16 is a top view of an airbag assembly including asymmetric lobes in a deployed state prior to impact by the occupant.

FIG. 16 is an overhead view of an airbag assembly 1600 including asymmetric lobes 1611i, 1611o in a deployed state prior to impact by the occupant 50. The airbag assembly 1600 includes an airbag cushion 1610 with a pair of lobes 1611i, 1611o that are asymmetric, each lobe 1611i, 1611o having a different depth dimension (front to rear relative to the vehicle) when fully deployed and inflated. For example the inboard lobe 1611i of the pair of lobes 1611 extends rearward further than an outboard lobe 1611o of the pair of lobes 1611. FIG. 16 includes a deployed inflatable curtain (IC) to show the airbag assembly 1600 in relation to the IC. The inflatable curtain IC has been deployed by operation of the appropriate mechanism(s). The airbag assembly 1600 may include an airbag housing 1602, an airbag inflator 1604, and the airbag cushion 1610. The airbag cushion 1610 has been deployed from the airbag housing 1602 by operation of the inflator 1604. The airbag housing 1602 is part of the airbag assembly 1600, which is mounted to the instrument panel 11 of the vehicle. The airbag cushion 1610 may include an inboard lateral panel 1616 and an outboard lateral panel 1614. The airbag cushion 1610 may include an inboard lobe 1611i and an outboard lobe 16110. The inboard lobe 1611i is at least partially formed by an inboard lateral panel 1616. The outboard lobe 1611o is at least partially formed by the outboard lateral panel 1614.

The inboard lobe 1611i deploys at a position toward the interior of the vehicle. The outboard lobe 1611o deploys at a position toward the exterior of the vehicle. The lobes 1611i, 1611o each extend rearward beyond a central rear face 1618 to be positioned on either side of the head 52 of the occupant 50 and above the torso/shoulders 54. The inboard lobe 1611i may extend pronouncedly rearward while the outboard lobe 1611o may extend only slightly rearward of the central rear face 1618 of the airbag cushion 1610. The inboard lobe 1611i may extend rearward from the central rear face 1618 a distance approximately equal to the length of the head 52 of the occupant 50 during contact with the fully deployed and inflated airbag cushion 1610.

An occupant-facing surface 1619 may be the exterior rear surface of the airbag cushion 1610 generally from the rearmost point of the inboard lobe 1611i and along the inboard lobe 1611i to and across the central panel 1618 and to the rearmost point of the outboard lobe 1611o. The inboard lateral panel 1616 faces inboard toward the interior of the vehicle, and an outboard lateral panel 1614 faces outboard toward a side door (not depicted) of the vehicle. The central rear face 1618 may provide a substantially flat surface as part of the occupant-facing surface 1619.

For reference purposes, the airbag cushion 1610 has a center line CL which is oriented front to rear from the center of the airbag housing 1602 to the center of the vehicle seating position 40 (approximately the center of the head 52 of the occupant 50 in a nominal, non-collision position). The inboard lateral panel 1616 has a lateral dimension $L_i$ from the airbag center line CL. The outboard lateral panel 1614 has a lateral dimension $L_o$ from the airbag center line CL. The inboard lateral dimension $L_i$ and outboard lateral dimension $L_o$ may differ from each other. The inboard lateral dimension $L_i$ is a function of the length of the inboard lateral panel 1616 and inboard lobe 1611*i*. Because the inboard lobe 1611*i* may extend rearward the length of the head 52 of the occupant 50 and over the torso/shoulders 54, the inboard lateral dimension $L_i$ may greater than the outboard lateral dimension $L_o$. The greater inboard lateral dimension $L_i$ may assist in preventing the occupant 50 from traveling through the inboard lobe 1611*i* or inboard lateral panel 1616 during ride down. The rearward length of the inboard lobe 1611*i* can serve to limit, reduce, or prevent rotation of the head 52 of the occupant 50. The outboard lateral dimension $L_o$ is a function of the shorter outboard lobe 1611*o* and outboard lateral panel 1614 related to the deployment of the inflatable curtain IC. That is, the outboard lateral dimension $L_o$ may prevent the outboard lobe 1611*o* and outboard lateral panel 1614 from interfering with the performance of the inflatable curtain IC while configuring the outboard lobe 1611*o* so that the outboard lobe 1611*o* may limit, reduce, or prevent rotation of the head 52 of the occupant 50 and the outboard lateral panel 1614 may prevent the occupant 50 from traveling through the outboard lobe 1611*o* and/or outboard lateral panel 1614.

The airbag cushion 1610 includes two internal vertical tethers 1612, which facilitate deployment and formation of the two lobes 1611*i*, 1611*o*, and configure the occupant-facing surface 1619. The internal tethers 1612 are secured at an interior portion of the airbag cushion 1610 at a forward location within the airbag cushion 1610 and also secured at an interior surface of the occupant-facing surface 1619. The tethers 1612 extend from the forward portion rearward through the interior of the airbag cushion 1610 (e.g., through an inflatable chamber of the airbag cushion 1610). The forward or first end of each tether 1612 attaches to an internal surface of its respective lateral (side) panel 1616, 1614. One tether 1612 may attach at a forward internal surface of the inboard lateral panel 1616, while the other tether 1612 may attach at a forward internal surface of the outboard lateral panel 1614. Each tether 1612 may then angle rearward and somewhat upward through the interior of the airbag cushion 1610. Each tether 1612 has a rear (or second) end which may attach at the internal surface of the occupant-facing surface 1619 of the airbag cushion 1610.

The tethers 1612 are vertical tethers because a connection at the occupant-facing surface 1619 (or rear face 1618) extends generally vertically, or generally up and down from a top portion of the occupant-facing surface 1619 toward a bottom portion of the occupant-facing surface 1619.

As the tethers 1612 are drawn taut during inflation and expansion of the airbag cushion 1610, the tethers 1612 draw a central portion of the occupant-facing surface 1619, proximally fixing the central portion of the occupant-facing surface 1619, while the two lobes 1611*i*, 1611*o* deploy further rearward on either side of the occupant-facing surface 1619 and on either side of the head 52 of the occupant 50. As the tethers 1612 draw and position the occupant-facing surface 1619, at least one low fabric tension zone or bubble may be created within the central portion of the occupant-facing surface 1619. The low fabric tension zone(s) may reduce limit, reduce, or prevent rotation of the head 52 of the occupant 50. The low fabric tension zone(s) may also a possibility of the airbag cushion 1610 inducing rotation of the head 52.

The tethers 1612, the lateral panels 1616, 1614, and the central rear-facing panel 1618 may be constructed and attached to each other in such a manner as to provide a specific configuration of high and low fabric tension zones in the occupant-facing surface 1619. As the tethers 1612 draw taut, they may provide a specific configuration to the occupant-facing surface 1619 and position the occupant-facing surface 1619 of the airbag cushion 1610. The tethers 1612 may, in particular, facilitate the formation of high fabric tension zones on that portion of the occupant-facing surface 1619 which is part of each of the lobes 1611*i*, 1611*o*. The tethers 1612 may also facilitate the formation of a low fabric tension zone on the rear-facing surface of the central panel 1618. The combination of high fabric tension zones in the occupant-facing surfaces of the lobes 1611*i*, 1611*o*, and a low fabric tension zone in the occupant-facing surface of the central panel 1618 may reduce or mitigate rotation of the head 52 of the occupant 50. Stated otherwise, the low fabric tension zone may be situated between the high fabric tension zones on the occupant-facing surfaces of the lobes 1611*i*, 1611*o*. This configuration of a low fabric tension zone between high fabric tension zones may, upon impact of the head 52 of the occupant 50, assist in preventing or reducing rotation of the head 52.

The lobes 1611*i*, 1611*o* may provide a high tension fabric zone on the occupant-facing surface of each lobe 1611*i*, 1611*o*. The high fabric tension zone on either lobe 1611*i*, 1611*o* (or on both) may reduce or limit rotation of the head 52. The high fabric tension zone provides support to prevent or limit the occupant from breaking through (travelling through) the lobes 1611*i*, 1611*o*. The lobes 1611*i*, 1611*o* may receive and/or contact or engage the head 52 of the occupant 50 and provide support to the sides of the head so as to counteract forces on the head 52 that may cause rotation of the head 52. The inboard lobe 1611*i*, in particular, may support the head 52 of the occupant 50 to prevent the head 52 from traveling through the inboard lobe 1611*i* and potentially coming into contact with inboard structures of the vehicle or another occupant. The outboard lobe 1611*o*, in particular, may support the head 52 of the occupant 50 and prevent the head 52 from traveling forward and laterally. At the same time, the shorter rearward extension of the outboard lobe 1611*o* may prevent the airbag cushion 1610 from interfering with the function of the inflatable curtain IC.

The inboard lateral panel 1616 may have a tapered forward profile 1616*a*, which is more specifically described below. The outboard lateral panel 1614 has a more-or-less flat forward profile 1614*a* of the forward portion of the airbag cushion 1610, which is also more fully described below.

In certain embodiments, the inboard lateral panel 1616 may be formed so as to create a curvilinear taper 1616*a* to produce a quarter-circular forward profile of the airbag cushion 1610. The curvilinear taper 1616*a* of the inboard lateral panel 1616 produces a rounded forward inboard corner 1616*a* of the airbag cushion 1610. In still other embodiments, the taper 1616*a* of the inboard lateral panel 1616 may be less curvilinear such that the airbag cushion 1610 obtains a generally triangular profile on the inboard aspect. In embodiments of a triangular taper 1616*a* at the forward inboard profile, an apex of the triangle is forward, at or near the dashboard 11, and the base of the triangle is rearward, toward the occupant seating area 40.

The dashboard 11 has a generally flat face rearward which may interact with the airbag cushion 1610. This interaction between the dashboard 11 and the airbag cushion 1610 supports the airbag cushion 1610 as the occupant 50 impacts the airbag cushion 1610 in a collision event and during ride down of the occupant 50. When a collision event involves only forward movement of the vehicle and the occupant 50, the dashboard 11 supports the airbag cushion 1610 which supports the occupant 50 and mitigates the deceleration of the occupant 50.

When a collision event involves rotation of an occupant relative to the vehicle, presently available airbag cushion systems employing an outboard inflatable curtain, which do not include a taper 1616a at the forward profile according to the disclosures herein, may not adequately support and decelerate the occupant, or may cause the occupant to rebound into a vehicle structure or component or another occupant and produce injury.

In the present embodiment, the airbag cushion 1610 may rotate inward with the occupant 50 because the taper 1616a at the forward inboard profile may allow the airbag cushion 1610 to "roll" or rotate to a limited degree inward along the rear surface of the dashboard 11. A taper 1616a of the forward inboard aspect of the airbag cushion 1610 may be positioned at an anchor point 1615 for the airbag cushion 1610 at the dashboard 11 at or near the airbag housing 1602. A taper 1616a on the inboard aspect of the airbag cushion 1610 may prevent the airbag cushion 1610 from rotating prior to contact by the occupant 50. Prior to the occupant 50 impacting the airbag cushion 1610, the deployed and inflated airbag cushion 1610 may have little or no contact with the dashboard 11 to the inboard side of the anchor point 1615 at or near the airbag housing 1602, which may permit the airbag cushion 1610 to rotate inboard around the anchor point 1615 at or near the airbag housing 1602 in conformity with inboard lateral and/or rotational movement of the occupant 50. Conversely, the outboard lateral panel 1614 has a more-or-less flat forward profile 1614a of the forward portion of the airbag cushion 1610. This generally flat forward profile 1614a may prevent or limit the rotation or "roll" of the airbag cushion 1610 outward toward the exterior. Preventing the airbag cushion 1610 from rotating or "rolling" outward toward the exterior may prevent the airbag cushion 1610 from interfering with the performance of the inflatable curtain IC.

In embodiments involving the lobes 1611i, 1611o, the tethers 112, and the ability of the airbag cushion 1610 to rotate inward with the occupant 50 (but not outward against the inflatable curtain IC), the airbag cushion 1610 may more effectively absorb and dissipate the momentum of the occupant 50 so as to mitigate impact by the occupant 50 with internal structures or components of the vehicle or another occupant and thereby reduce or eliminate injury to the occupant 50 and, more particularly, the head 52. This inward rotation of the airbag cushion 1610 may also reduce or eliminate the possibility that the airbag cushion 1610 could cause the occupant 50 to rebound from the airbag cushion 1610 into a structure or component of the vehicle or another occupant. This configuration may also allow the occupant-facing surface 1619 and lobes 1611i, 1611o to more effectively limit rotation of the head 52 of the occupant 50 and reduce potential head injury criterion (HIC) and/or brain injury criterion (BrIC).

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An inflatable airbag cushion comprising:
   an occupant-facing surface to be positioned forward of a vehicle seating position for receiving a head of an occupant during a collision event, the occupant-facing surface including:
      a convexly shaped central receiving area to provide an impact surface configured to receive the head of the occupant during the collision event, and
      a pair of lobes disposed on opposing sides of the central receiving area, the pair of lobes configured to inflate to extend rearward to engage opposing sides of a head of the occupant to reduce a rotational velocity of the head of the occupant during the collision event, wherein the pair of lobes is configured to extend rearward over the shoulders of the occupant during the collision event; and
   a plurality of lateral surfaces adjoining the occupant-facing surface and extending forward from the occupant-facing surface to define an inflatable chamber to receive inflation gas.

2. The inflatable airbag of claim 1, wherein a pair of opposing lateral surfaces of the plurality of surfaces taper together to provide a symmetric tapering cross-section at a forward portion of the inflatable airbag.

3. The inflatable airbag of claim 2, wherein the pair of opposing lateral surfaces curve at a forward portion to form rounded corners that define the symmetric taper and form the forward portion of the inflatable airbag to have a semi-circular horizontal cross-section.

4. The inflatable airbag of claim 2, wherein the symmetric taper configures the forward portion of the inflatable airbag to have a triangular cross-section.

5. The inflatable airbag of claim 1, further comprising a tether to draw the central receiving area of the occupant-facing surface to at least partially form the pair of lobes.

6. The inflatable airbag of claim 5, wherein the tether is disposed internal to the inflatable airbag cushion and coupled to internal surfaces to draw the central receiving area of the occupant-facing surface to form a low fabric tension area at the impact surface between the pair of lobes.

7. The inflatable airbag of claim 5, wherein the tether is a zero-length tether disposed in the occupant-facing surface to draw the central receiving area of the occupant-facing surface to form a low fabric tension area at the impact surface between the pair of lobes.

8. The inflatable airbag of claim 7, wherein the zero-length tether comprises a seam formed by one of stitching, RF welding, ultrasonic welding, or gluing.

9. The inflatable airbag of claim 1, wherein the central receiving area and pair of lobes together comprise a lobe chamber that is a secondary inflatable chamber disposed on and coupled to the occupant-facing surface and in fluid communication through the occupant-facing surface with the inflatable chamber, the central receiving area at least partially defining a central portion of the lobe chamber and the pair of lobes each defining an end of the lobe chamber.

10. The inflatable airbag of claim 9, wherein the ends of the lobe chamber are configured to pivot relative to the central portion to fold into engagement with the head of the occupant to support and reduce head rotation, upon the lobe chamber receiving an occupant.

11. The inflatable airbag of claim 9, wherein the lobe chamber is configured to receive inflation gas from the inflatable chamber and inflate to a lower pressurization than the inflatable chamber.

12. The inflatable airbag of claim 9, wherein the lobe chamber comprises pinch seams to position each of the pair of lobes at an angle relative to the central portion, each of the pinch seams having a vertical orientation and disposed between a lobe of the pair of lobes and the central portion.

13. The inflatable airbag of claim 9, wherein the lobe chamber comprises a central area flatness control stitch having a horizontal orientation.

14. The inflatable airbag of claim 1, wherein the pair of lobes are formed by distinct lobe chambers positioned on opposing sides of a central chamber.

15. The inflatable airbag of claim 14, wherein the lobe chambers are in fluid communication with the central chamber to provide inflation gas to the central chamber.

16. The inflatable airbag of claim 1, wherein the pair of lobes are asymmetric, each lobe having a different depth dimension front to back.

17. An inflatable airbag cushion comprising:
an occupant-facing surface to be positioned forward of a vehicle seating position for receiving a head of an occupant during a collision event, the occupant-facing surface including:
 a central receiving area to provide an impact surface configured to receive the head of the occupant during the collision event, and
 a pair of lobes disposed on opposing sides of the central receiving area, the pair of lobes inflating to extend rearward to engage a head of the occupant to reduce a rotational velocity of the head of the occupant during the collision event, wherein the pair of lobes is configured to extend rearward over the shoulders of the occupant during the collision event;
a pair of lateral sides that taper together to provide a symmetric taper at a forward portion of the inflatable airbag; and
a plurality of vertical tethers disposed internal to the inflatable airbag cushion and coupled to internal surfaces to draw the central receiving area of the occupant-facing surface to configure the impact surface to form a low fabric tension bubble that extends between the pair of lobes, wherein each of the plurality of vertical tethers is horizontally offset from an adjacent tether of the plurality of vertical tethers.

18. The inflatable airbag of claim 17, wherein a pair of lateral sides curve at a forward portion to form rounded corners that define the symmetric taper and form the forward portion of the inflatable airbag to have a semi-circular horizontal cross-section.

19. The inflatable airbag of claim 17, wherein the symmetric taper configures the forward portion of the inflatable airbag to have a triangular cross-section.

20. The inflatable airbag of claim 17, wherein the pair of lobes are asymmetric, each having a different depth dimension front to back.

21. An inflatable airbag cushion comprising:
an occupant-facing surface to be positioned forward of a vehicle seating position for receiving a head of an occupant during a collision event, the occupant-facing surface including:
 a convexly shaped central receiving area to provide an impact surface configured to receive the head of the occupant during the collision event, and
 a pair of lobes disposed on opposing sides of the central receiving area, the pair of lobes to inflate to extend rearward to engage opposing sides of a head of the occupant to reduce a rotational velocity of the head of the occupant during the collision event, wherein the pair of lobes is configured to extend rearward over the shoulders of the occupant during the collision event; and
a plurality of lateral surfaces adjoining the occupant-facing surface and extending forward from the occupant-facing surface to define an inflatable chamber to receive inflation gas,
wherein a pair of opposing lateral surfaces of the plurality of surfaces taper together to provide a symmetric tapering cross-section at a forward portion of the inflatable airbag, and
wherein the symmetric taper configures the forward portion of the inflatable airbag to have a triangular cross-section.

* * * * *